US010010139B2

(12) United States Patent
Baucom et al.

(10) Patent No.: US 10,010,139 B2
(45) Date of Patent: Jul. 3, 2018

(54) METHOD FOR MAKING A CLEATED PLATE MEMBER AND APPARATUS

(71) Applicant: NIKE, Inc., Beaverton, OR (US)

(72) Inventors: Jim Baucom, Portland, OR (US); Matthew R. Pauk, Portland, OR (US)

(73) Assignee: NIKE, Inc., Beaverton, OR (US)

(*) Notice: Subject to any disclaimer, the term of this patent is extended or adjusted under 35 U.S.C. 154(b) by 765 days.

(21) Appl. No.: 14/452,861

(22) Filed: Aug. 6, 2014

(65) Prior Publication Data

US 2015/0040438 A1    Feb. 12, 2015

Related U.S. Application Data

(60) Provisional application No. 61/863,263, filed on Aug. 7, 2013.

(51) Int. Cl.
*A43B 23/28* (2006.01)
*A43B 5/00* (2006.01)
(Continued)

(52) U.S. Cl.
CPC ............... *A43C 15/16* (2013.01); *A43B 5/00* (2013.01); *A43B 13/26* (2013.01); *A43C 15/161* (2013.01);
(Continued)

(58) Field of Classification Search
CPC ..... A43C 15/16; A43C 15/161; A43C 15/162; B29D 35/128; B29D 35/122; B29D 35/06;
(Continued)

(56) References Cited

U.S. PATENT DOCUMENTS 3,040,450 A    6/1962 Phillips
3,559,311 A    2/1971 Louis et al.
(Continued)

FOREIGN PATENT DOCUMENTS

DE    2853745 A1    8/1979
DE    3915157 A1    11/1989
(Continued)

OTHER PUBLICATIONS

International Preliminary Report on Patentability for Application No. PCT/US2014/050057, dated Feb. 9, 2016, 8 pages.
(Continued)

*Primary Examiner* — Clinton T Ostrup
*Assistant Examiner* — Cameron A Carter
(74) *Attorney, Agent, or Firm* — Honigman Miller Schwartz and Cohn LLP; Matthew H. Szalach; Jonathan P. O'Brien

(57) ABSTRACT

A method for making a cleated plate member of an article of footwear includes forming a blade cleat assembly having an anchor member associated with a blade member, the blade member having a planar body, the body having a base portion, a head portion opposite the base portion, and a through hole formed in the base portion, a first molding material of the anchor member surrounding the base portion of the blade member and extending through the through hole formed in the base portion of the blade member, and associating the blade cleat assembly with an exposed surface of a plate body to form a cleated plate member. The base portion of the blade member further may include a pair of opposing shoulder flange portions. A blade cleat assembly may be disposed in a cleat assembly receptacle of a mold system configured to form a cleated plate member.

30 Claims, 23 Drawing Sheets

(51) Int. Cl.
    *A43C 15/00* (2006.01)
    *A43C 15/16* (2006.01)
    *B29D 35/08* (2010.01)
    *B29D 35/14* (2010.01)
    *B29D 35/06* (2010.01)
    *A43B 13/26* (2006.01)
    *B29D 35/12* (2010.01)

(52) U.S. Cl.
    CPC ............ *A43C 15/162* (2013.01); *B29D 35/06* (2013.01); *B29D 35/084* (2013.01); *B29D 35/088* (2013.01); *B29D 35/122* (2013.01); *B29D 35/128* (2013.01); *B29D 35/142* (2013.01); *B29D 35/148* (2013.01)

(58) Field of Classification Search
    CPC .. B29D 35/084; B29D 35/088; B29D 35/142; B29D 35/148
    USPC ........................................ 36/59 R, 134, 67 A
    See application file for complete search history.

(56) References Cited

U.S. PATENT DOCUMENTS

| | | | |
|---|---|---|---|
| 4,674,207 A | 6/1987 | Yamaguchi | |
| 4,833,796 A | 5/1989 | Flemming | |
| 5,426,873 A * | 6/1995 | Savoie ................. | A43C 15/165 12/142 R |
| 5,987,784 A | 11/1999 | Bignell | |
| 6,041,461 A | 3/2000 | Ogawa et al. | |
| 6,112,433 A | 9/2000 | Greiner | |
| 8,082,686 B2 | 12/2011 | Campbell et al. | |
| 8,215,035 B2 | 7/2012 | Mills et al. | |
| 8,234,799 B2 | 8/2012 | Kokavee | |
| 2003/0093926 A1* | 5/2003 | Auger ................. | A43C 15/161 36/134 |
| 2004/0159020 A1* | 8/2004 | Briant ................. | A43B 5/02 36/134 |
| 2005/0016029 A1* | 1/2005 | Auger ................. | A43B 1/0072 36/134 |
| 2009/0235558 A1* | 9/2009 | Auger ................. | A43C 15/162 36/30 R |
| 2010/0192421 A1 | 8/2010 | Kerns et al. | |
| 2011/0088287 A1* | 4/2011 | Auger ................. | A43B 5/02 36/107 |
| 2011/0289801 A1* | 12/2011 | Amos ................. | A43B 13/141 36/134 |
| 2012/0266490 A1* | 10/2012 | Atwal ................. | A43C 15/161 36/62 |
| 2013/0067772 A1* | 3/2013 | Auger ................. | A43B 5/02 36/103 |
| 2013/0067773 A1* | 3/2013 | Auger ................. | A43B 5/02 36/103 |
| 2013/0067774 A1* | 3/2013 | Auger ................. | A43B 5/02 36/103 |
| 2013/0067776 A1* | 3/2013 | Auger ................. | A43B 5/02 36/25 R |
| 2014/0026441 A1* | 1/2014 | Stauffer ................. | A43C 15/00 36/103 |
| 2014/0026444 A1* | 1/2014 | Howley ................. | A43B 13/14 36/134 |

FOREIGN PATENT DOCUMENTS

| | | |
|---|---|---|
| FR | 2409023 A1 | 6/1979 |
| JP | 2001120308 A | 5/2001 |
| JP | 2012034739 A | 2/2012 |
| WO | 9201399 A1 | 2/1992 |

OTHER PUBLICATIONS

Response to EP Communication Pursuant to Rules 161 and 162 EPC filed Jul. 28, 2016 for European Application No. 14766556.6, 36 pages.
Detailed Observation and Voluntary Amendment filed Jul. 13, 2016 for CN Application No. 201480042873.7.
Office Action dated Sep. 1, 2016 for Chinese Patent Application No. 201480042873.7, 17 pages.
International Search Report and Written Opinion for Application No. PCT/US2014/050057, dated Oct. 30, 2014.

* cited by examiner

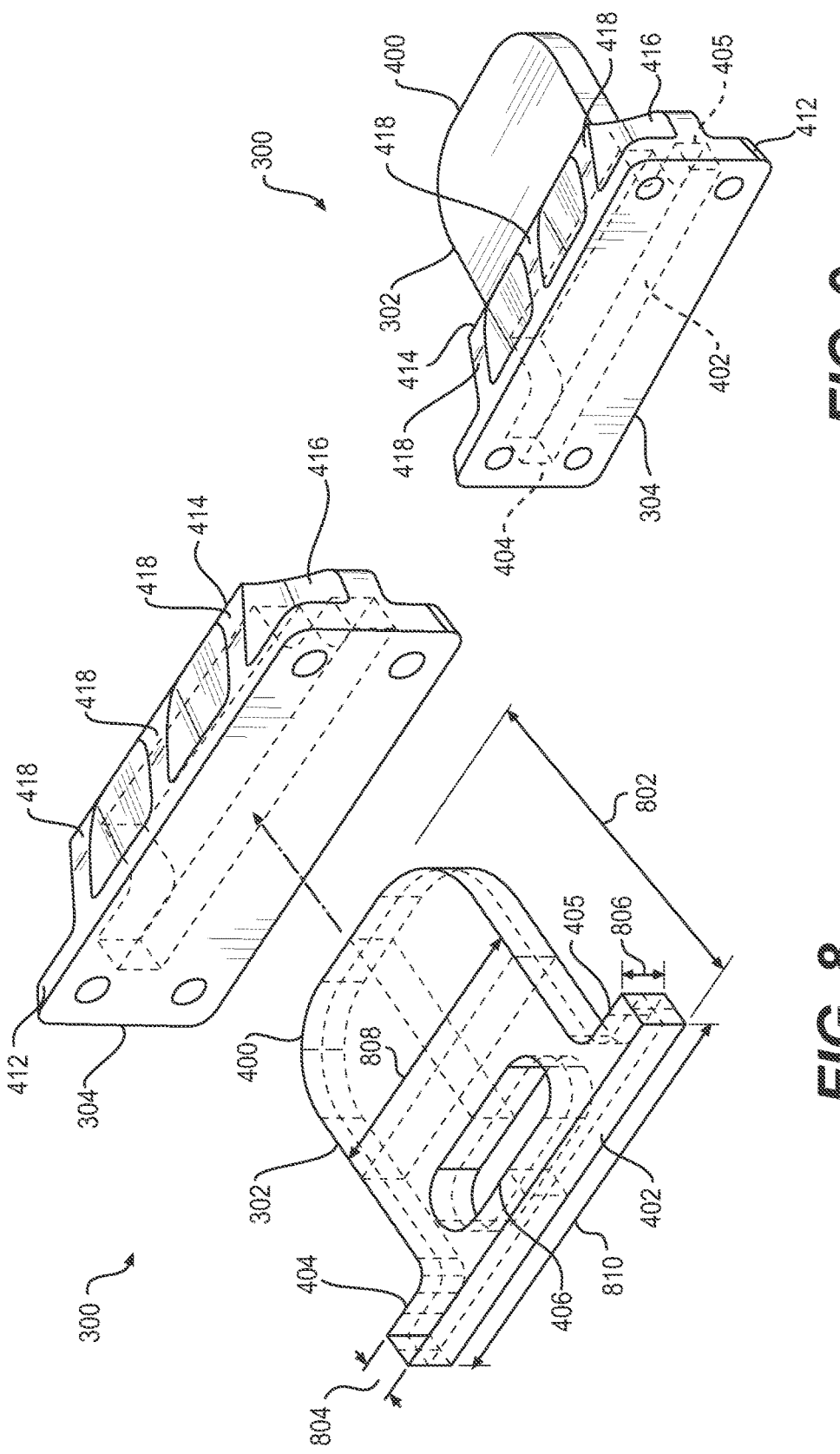

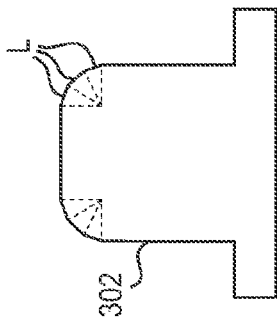
FIG. 10
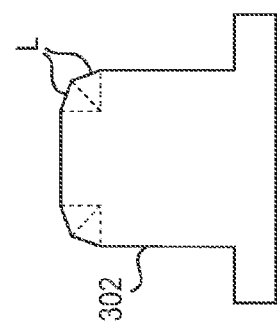
FIG. 11
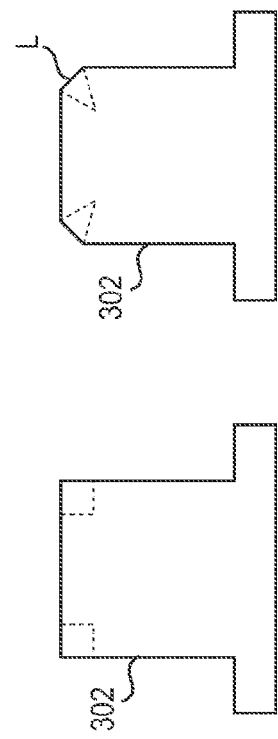
FIG. 12
FIG. 13
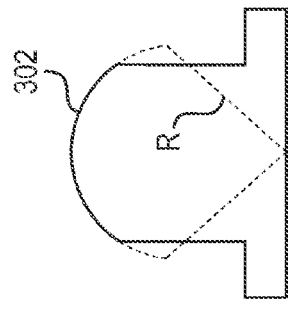
FIG. 14
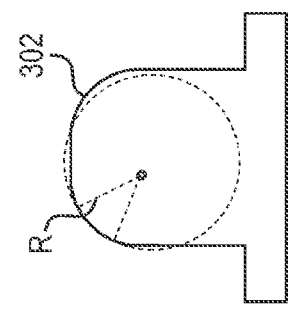
FIG. 15
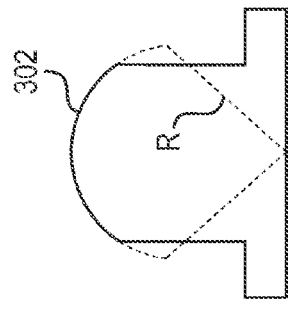
FIG. 16
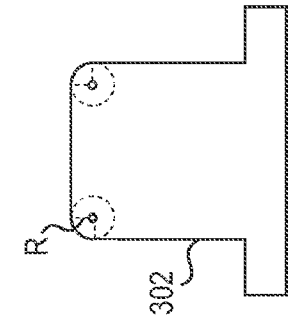
FIG. 17

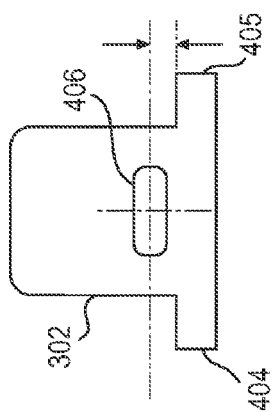
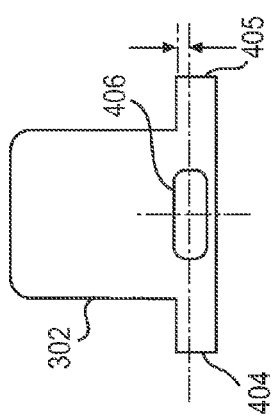
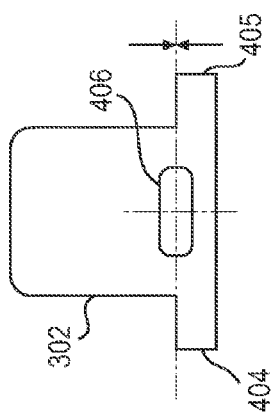

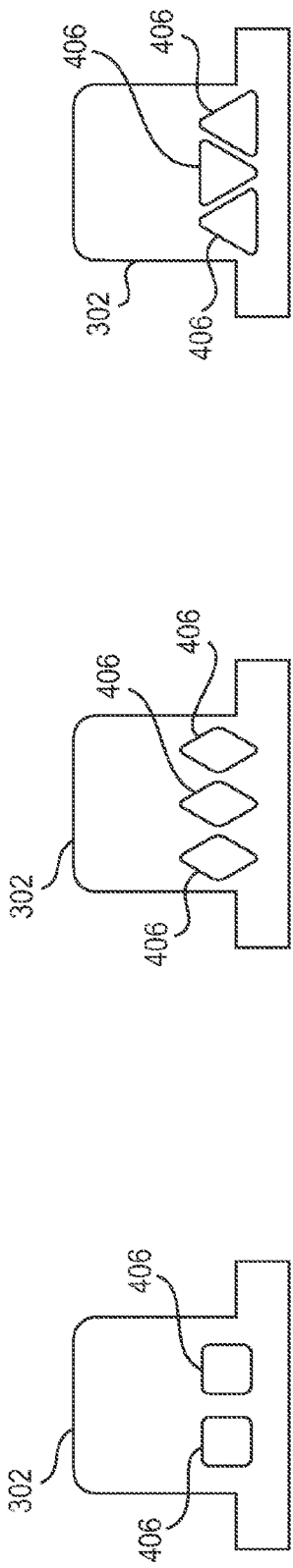

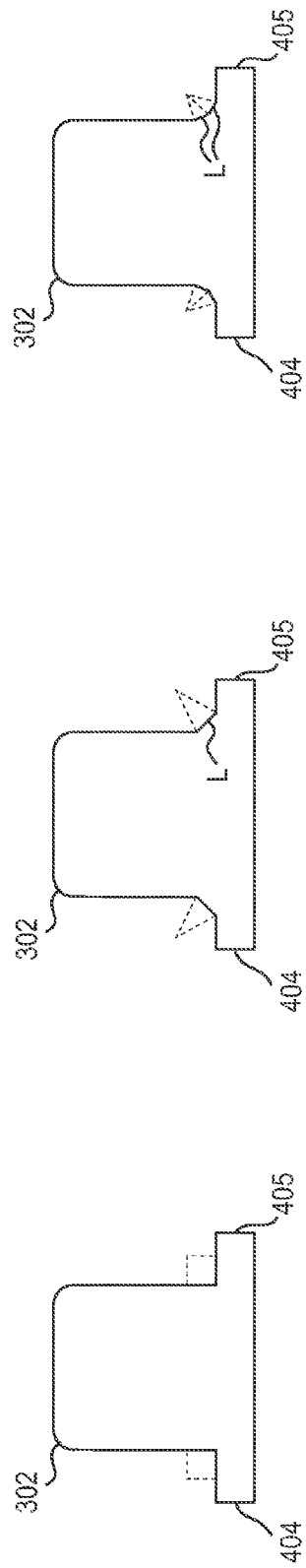
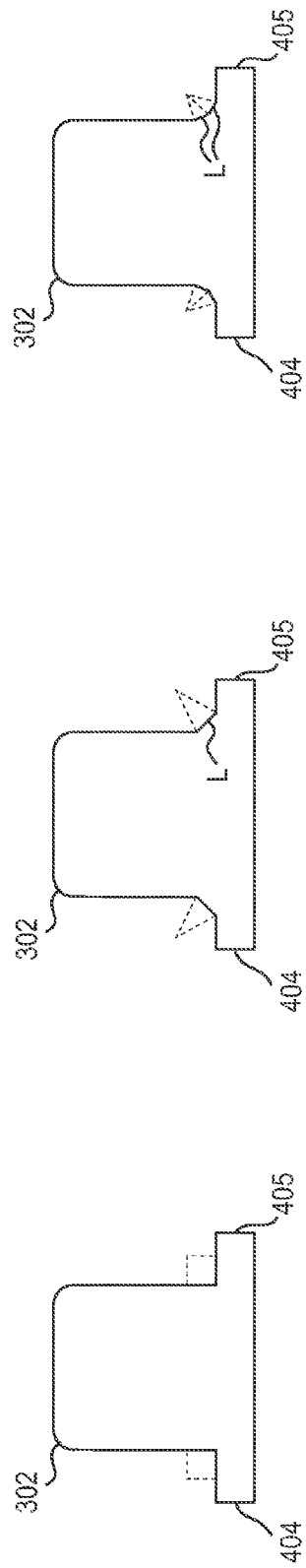
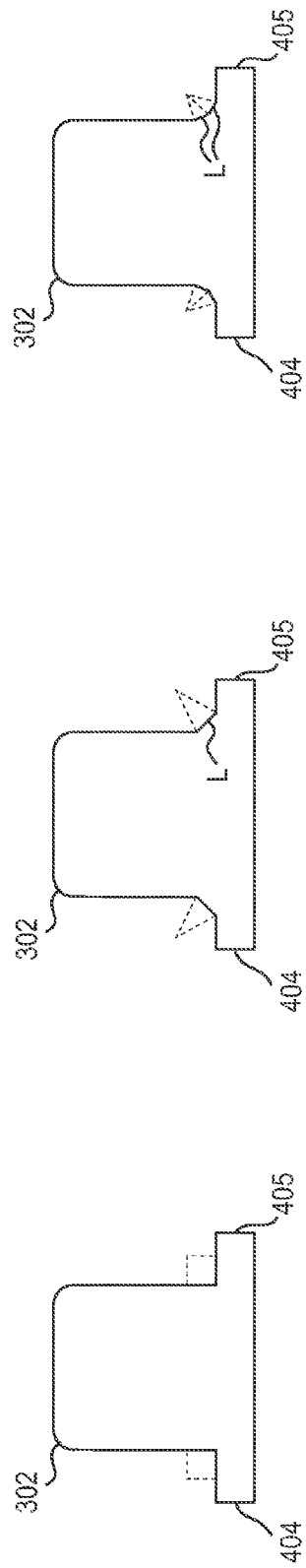
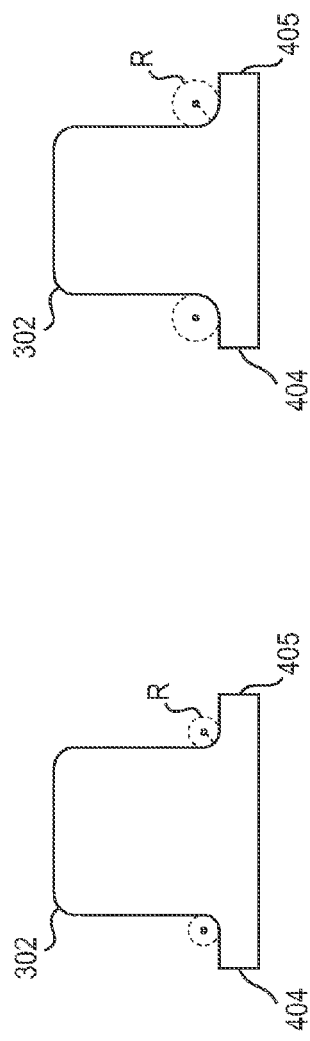
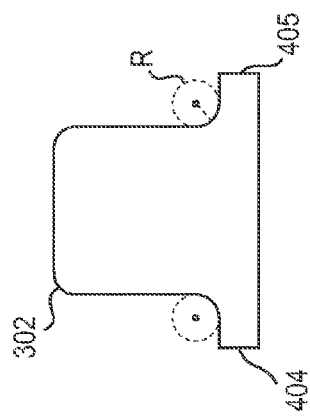

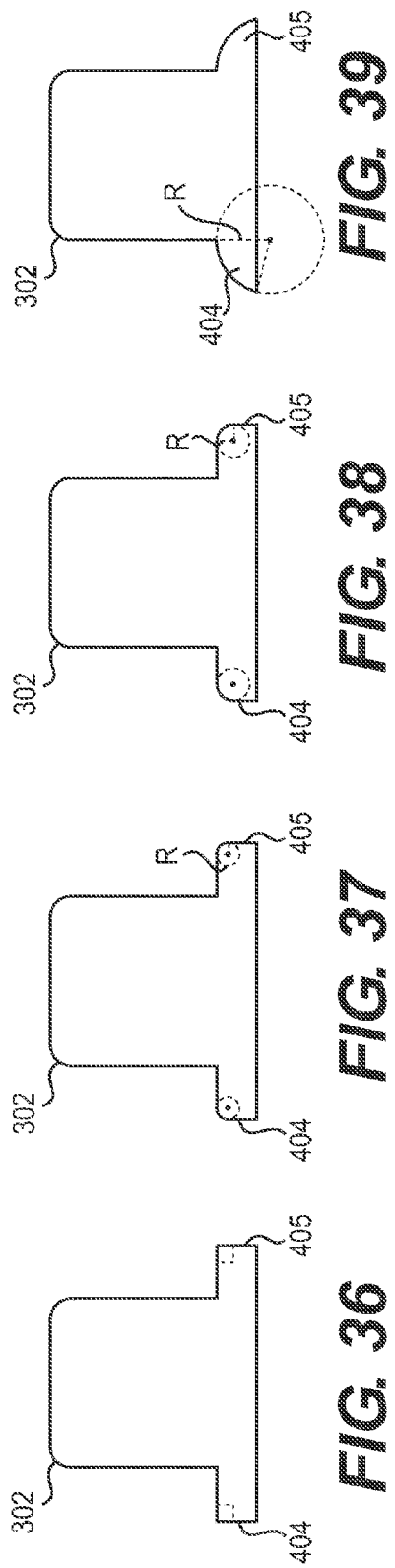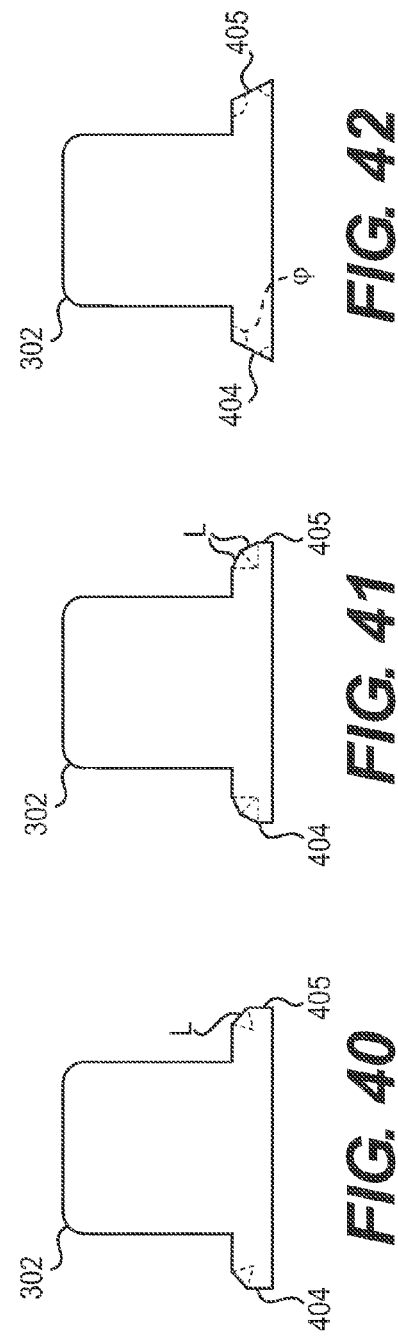

METHOD FOR MAKING A CLEATED PLATE MEMBER AND APPARATUS

RELATED APPLICATION

This application claims priority to U.S. Provisional Application No. 61/863,263, filed Aug. 7, 2013, and titled "Method for Making a Cleated Plate Member and Apparatus," which application is incorporated herein by reference in its entirety.

BACKGROUND

The present embodiments relate generally to articles of footwear, and more particularly to a method for making a cleated plate member including a blade cleat assembly.

SUMMARY

In one aspect, a method for making a cleated plate member of an article of footwear includes forming a blade cleat assembly having an anchor member associated with a blade member, the blade member having a body, the body having a planar base portion, a head portion opposite the base portion, and a through hole formed in the base portion, a first molding material of the anchor member surrounding the base portion of the blade member and extending through the through hole formed in the base portion of the blade member, and associating the blade cleat assembly with an exposed surface of a plate body to form a cleated plate member.

In some embodiments, the method may include forming a blade cleat assembly having an anchor member associated with a blade member using a first molding system, and associating the blade cleat assembly with a plate member in a second molding system to form a cleated plate member. In some embodiments, a blade cleat assembly may be associated with a plate member by bonding, e.g., using a molding process. In some embodiments, associating a blade cleat assembly with a plate member may include disposing a blade cleat assembly into a cleat assembly receptacle of a mold cavity of a molding system. In some embodiments, the method may include disposing at least one blade cleat assembly within a cleat assembly receptacle of a mold cavity of the molding system, and injecting a second molding material into the mold cavity of the molding system. In some embodiments, disposing a blade cleat assembly in a cleat assembly receptacle may include selectively locating the cleat blade assembly relative to a mold surface of the mold cavity corresponding to an exposed surface of the cleated plate member molded by the molding system so that the blade cleat assembly is located at a selected height relative to the exposed surface of the cleated member molded by the molding system, e.g., so that the blade cleat assembly may be recessed or at least partially embedded in the cleated plate member molded by the molding system.

In another aspect, a cleated plate member for an article of footwear includes a plate body made of a first molding material, and at least one blade cleat assembly associated with an exposed surface of the plate body, the at least one blade cleat assembly including an anchor member associated with a blade member, the blade member having a body, the body having a planar base portion, a head portion opposite the base portion, and a through hole formed in the base portion, a second molding material of the anchor member surrounding the base portion of the blade member and extending through the through hole formed in the base portion of the blade member.

In another aspect, a blade cleat assembly includes a blade member and an anchor member, the blade member having a body, the body having a planar base portion, a head portion opposite the base portion, and a through hole formed in the base portion, the anchor member being made of a first molding material, the first molding material surrounding the base portion of the blade member and extending through the through hole formed in the base portion of the blade member.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, and within the scope of the invention, and be protected by the following claims.

BRIEF DESCRIPTION OF THE DRAWINGS

The embodiments can be better understood with reference to the following drawings and description. Components in the figures are not necessarily to scale, emphasis instead being placed upon illustrating structural and functional principles of the embodiments. In the figures, like reference numerals designate corresponding parts throughout the different views, with the initial digit(s) of each reference number indicating the figure in which the feature is first shown.

FIG. 8 is an exploded isometric bottom view of a blade member and an anchor member of the blade cleat assembly of FIG. 4;

FIG. 9 is an isometric bottom view of the blade cleat assembly of FIG. 4;

FIG. 10 is a side plan view of an embodiment of a blade member having a square (right angle) blade configuration;

FIG. 11 is a side plan view of an embodiment of a blade member having a single bevel blade configuration;

FIG. 12 is a side plan view of an embodiment of a blade member having a double bevel blade configuration;

FIG. 13 is a side plan view of an embodiment of a blade member having a triple bevel blade configuration;

FIG. 14 is a side plan view of an embodiment of a blade member having a small radius rounded blade configuration;

FIG. 15 is a side plan view of an embodiment of a blade member having a large radius rounded blade configuration;

FIG. 16 is a side plan view of an embodiment of a blade member having a large-radius-small-angle rounded blade configuration;

FIG. 17 is a side plan view of an embodiment of blade member having an arch-shaped blade;

FIG. 23 is a side plan view of an embodiment of a blade member having a generally rectangular-shaped through-hole with an axis generally aligned with a shoulder of the blade member;

FIG. 24 is a side plan view of an embodiment of a blade member having a generally rectangular-shaped through-hole with an axis generally disposed below a shoulder of the blade member;

FIG. 25 is a side plan view of an embodiment of a blade member having a generally rectangular-shaped through-hole with an axis generally disposed above a shoulder of the blade member;

FIG. 26 is a side plan view of an embodiment of a blade member having two generally rectangular-shaped through-holes arranged in a straight line (horizontal) configuration;

FIG. 27 is a side plan view of an embodiment of a blade member having three diamond-shaped through-holes arranged in a straight line (horizontal) configuration;

FIG. 28 is a side plan view of an embodiment of a blade member having three triangular-shaped through-holes arranged in an alternating orientation configuration;

FIG. 29 is a side plan view of an embodiment of a blade member having three diamond-shaped through-holes arranged in an offset configuration;

FIG. 30 is a side plan view of an embodiment of a blade member having four triangular-shaped through-holes arranged in a fan configuration;

FIG. 31 is a side plan view of an embodiment of a blade member having a square (right angle) neck configuration;

FIG. 32 is a side plan view of an embodiment of a blade member having a single bevel neck configuration;

FIG. 33 is a side plan view of an embodiment of a blade member having a double bevel neck configuration;

FIG. 34 is a side plan view of an embodiment of a blade member having a small radius neck configuration;

FIG. 35 is a side plan view of an embodiment of a blade member having a large radius neck configuration;

FIG. 36 is a side plan view of an embodiment of a blade member having a square (right angle) shoulder configuration;

FIG. 37 is a side plan view of an embodiment of a blade member having a small radius shoulder configuration;

FIG. 38 is a side plan view of an embodiment of a blade member having a large radius shoulder configuration;

FIG. 39 is a side plan view of an embodiment of a blade member having an arched shoulder configuration;

FIG. 40 is a side plan view of an embodiment of a blade member having a single bevel shoulder configuration;

FIG. 41 is a side plan view of an embodiment of a blade member having a double bevel shoulder configuration;

FIG. 42 is a side plan view of an embodiment of a blade member having an angled or truncated shoulder configuration;

DETAILED DESCRIPTION

A method for making a cleated plate member including at least one blade cleat assembly is disclosed herein. The term "cleated plate member" as used in this detailed description and throughout the claims generally includes an element configured to be disposed as an outsole for an article of footwear that includes one or more cleat members. A cleated plate member may take the form of an outsole or a sole structure for any article of footwear including, but not limited to: baseball shoes, hiking boots, soccer shoes, football shoes, sneakers, rugby shoes, basketball shoes, track shoes, as well as other kinds of shoes. In some embodiments, a cleated plate member may comprise essentially an entirety of an outsole of an article of footwear. In other embodiments, a cleated plate member may comprise a portion of an outsole of an article of footwear including, but not limited to, one or more of a forefoot region, a midfoot region, and/or a heel region. In other embodiments, different configurations of a cleated plate member may be included in an article of footwear. For purposes of illustration, in various embodiments herein a cleated plate member is shown in isolation. In other embodiments, however, the cleated plate member could be associated with an upper for an article of footwear.

Figure 1:
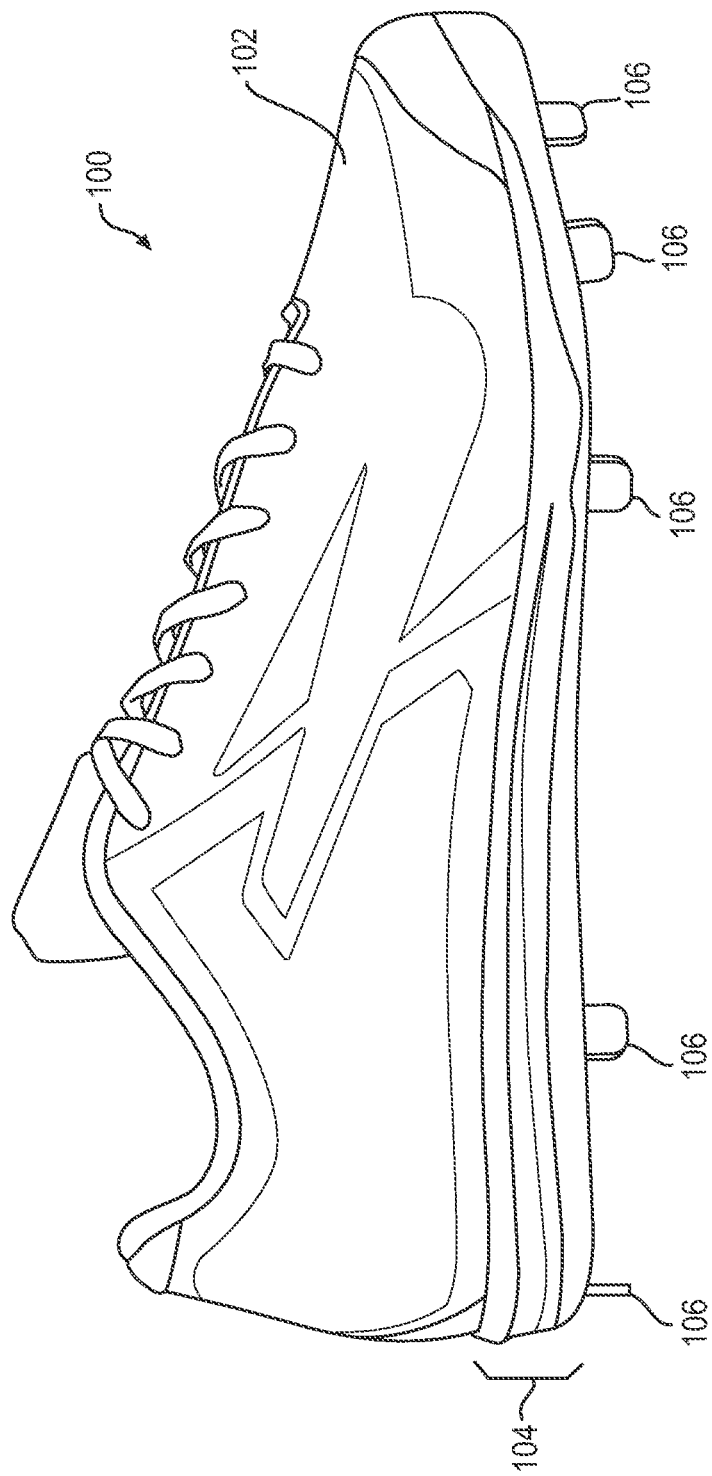
FIG. 1 is a profile view of an embodiment of an article of footwear including a cleated plate member having a plurality of blade cleats.

FIG. 1 is a profile view of an embodiment of an article of footwear 100 including a cleated plate member having a plurality of blade cleats. As shown in FIG. 1, in some embodiments article of footwear 100 may include an upper 102 and a sole structure 104 having a plurality of blade cleats 106.

Figure 2:
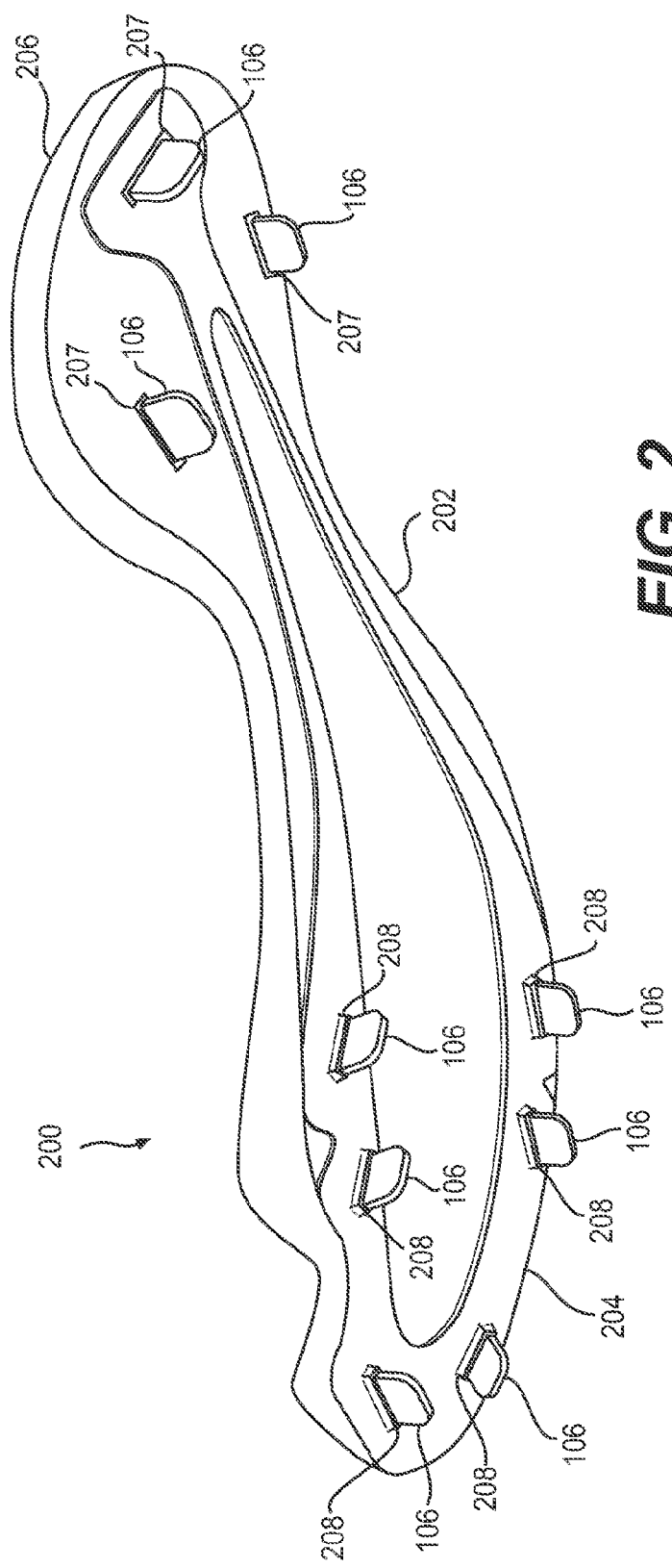
FIG. 2 is an isometric view of an embodiment of a cleated plate member.
Figure 3:
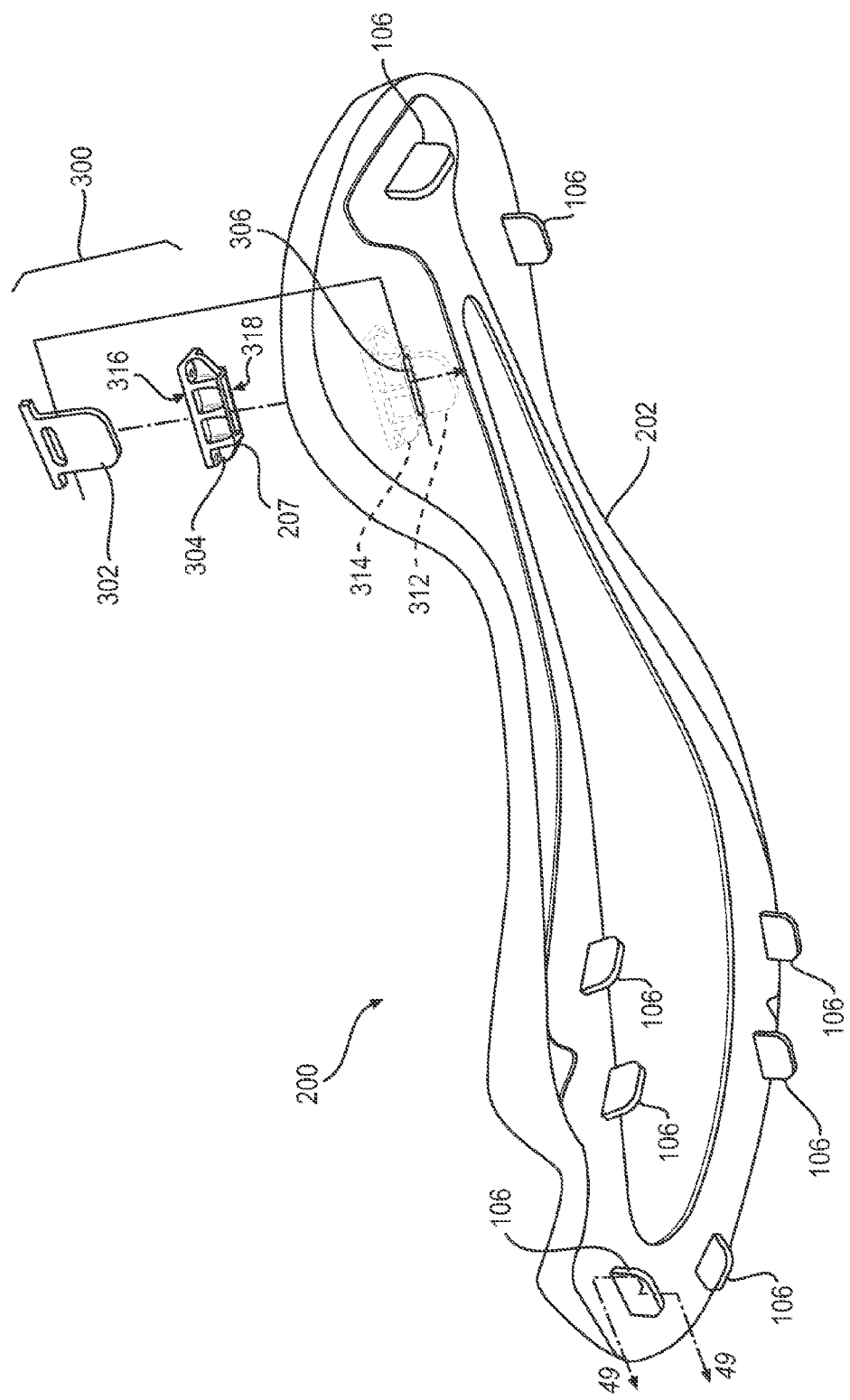
FIG. 3 is an isometric view of an embodiment of a cleated plate member including an exploded view of an embodiment of a blade cleat assembly embedded in a plate body of the cleated plate member.

FIGS. 2 and 3 are isometric views of embodiments of a cleated plate member. FIG. 2 illustrates an embodiment of a cleated plate member 200 including a plate body 202 having a plurality of blade cleats 106. FIG. 3 illustrates an embodiment of a cleated plate member 200 including an exploded view of an embodiment of a blade cleat assembly 300 embedded in the plate body 202 of the cleated plate member 200. As shown in FIGS. 2 and 3, in some embodiments blade cleat assembly 300 generally includes a blade member 302 associated with an anchor member 304.

As shown in exploded view in FIG. 3, and as discussed below, a blade member 302 may be associated with an anchor member 304, e.g., by a first molding process embedding blade member 302 in anchor member 304, to form a blade cleat assembly 300, and blade cleat assembly 300 may be associated with plate body 202, e.g., in a second molding process, to form a cleated plate member 200. In some embodiments, at least a portion of blade cleat assembly 300 may be recessed or embedded in plate body 202 of cleated plate member 200 (e.g., as illustrated in phantom in FIG. 3 as portion 314), with an exposed portion of the blade member 302 (illustrated in phantom in FIG. 3 as 312) extending from an exposed bottom surface of plate body 202 to form a blade cleat 106. For purposes of clarity, FIG. 3 shows a generally rectangular-shaped slot or opening 306 in the exposed surface of plate body 202 of cleated plate member 200 where the exposed portion 312 (in phantom) of blade member 302 extends from plate body 202.

Blade cleat assembly 300 may be associated with plate body 202 so that blade cleat assembly 300 is located at a selected height relative to the exposed surface of plate body 202 member. For example, in some embodiments blade cleat assembly 300 selectively may be embedded in plate body 202 at different depths during a molding process for forming cleated plate member 200. In some embodiments, blade cleat assembly 300 may be located at a depth selected so that anchor member 304 is completely embedded in plate body 202 and only a portion of blade member 302 extends out from an exposed surface of plate body 202 (see FIG. 3; see also FIG. 51). In some embodiments, blade cleat assembly 300 may be located at a depth selected so that an upper surface 207 of anchor member 304 is flush with an exposed surface of plate body 202 (see, e.g., heel region 206 of FIG. 2; see also FIG. 49). In some embodiments, blade cleat assembly 300 may be located at a depth selected so that an exposed surface of anchor member 304 extends distally of an exposed surface of plate body 202, thus forming an exposed base portion 208 of a blade cleat 106 (see, e.g., forefoot region 204 of FIG. 2; see also FIG. 50). Those skilled in the art will be able to select a relative height of blade cleat assembly 300 suitable for obtaining a desired cleated plate member 200.

Figure 4:
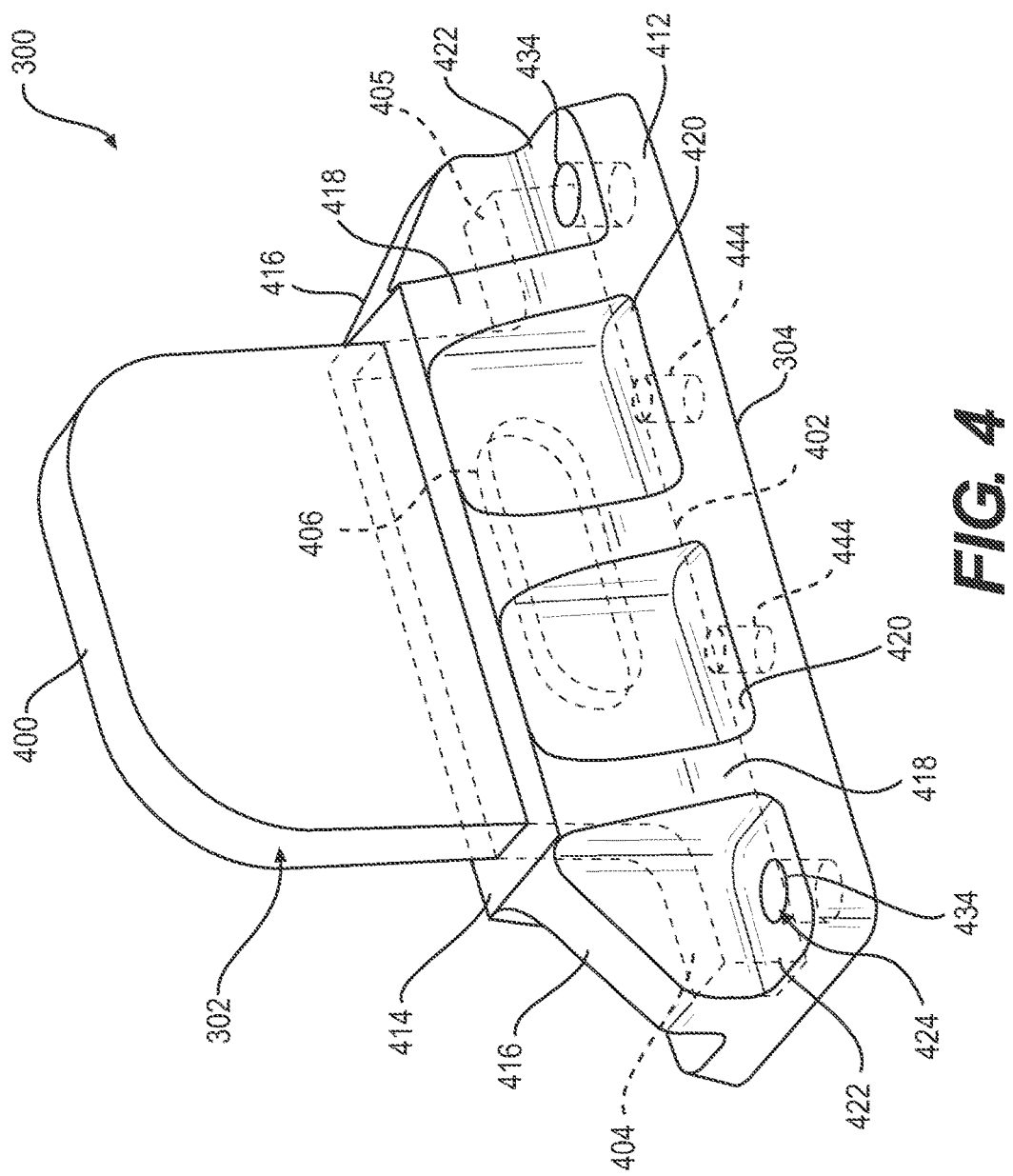
FIG. 4 is an isometric view of an embodiment of a blade cleat assembly.
Figure 5:
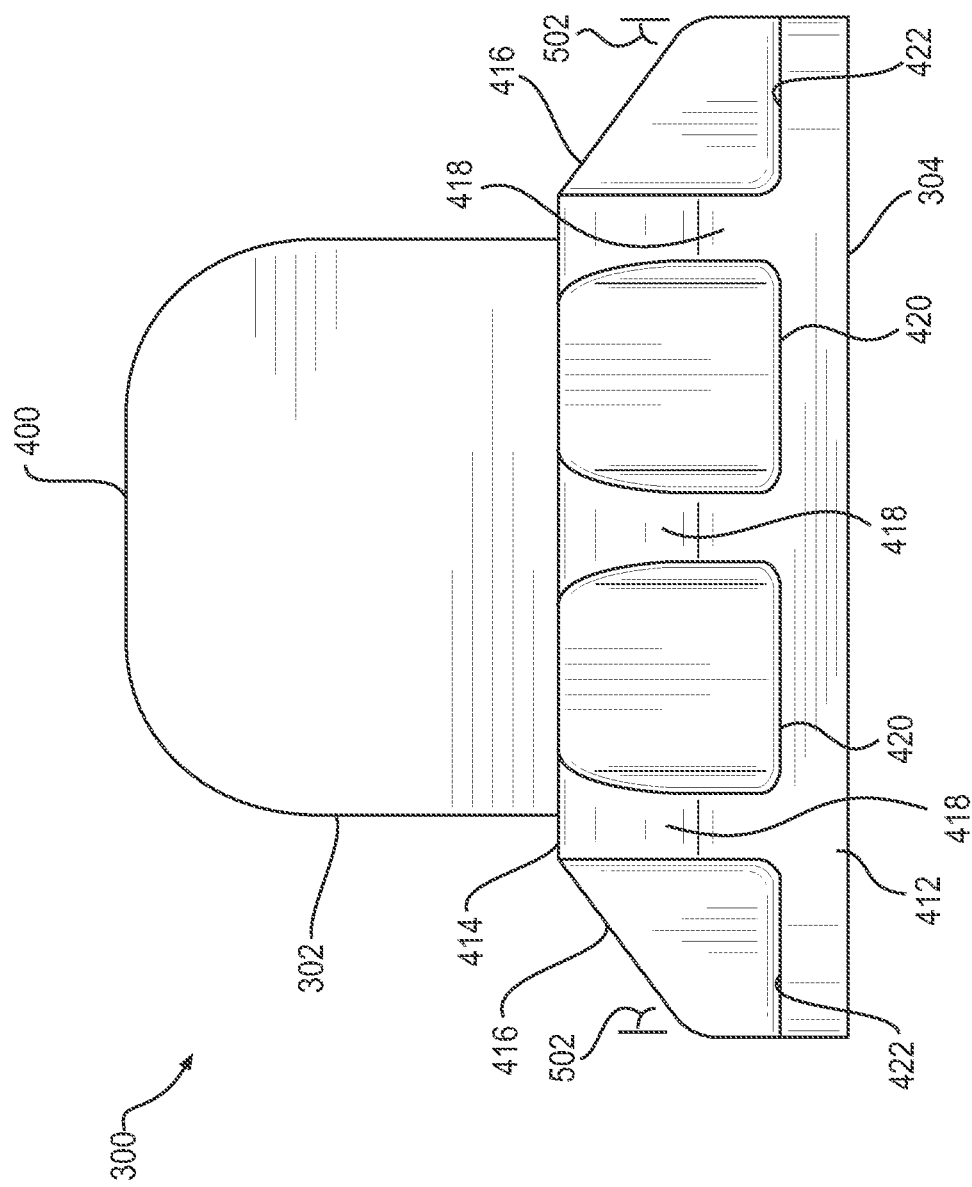
FIG. 5 is a side view of the blade cleat assembly of FIG. 4.
Figure 6:
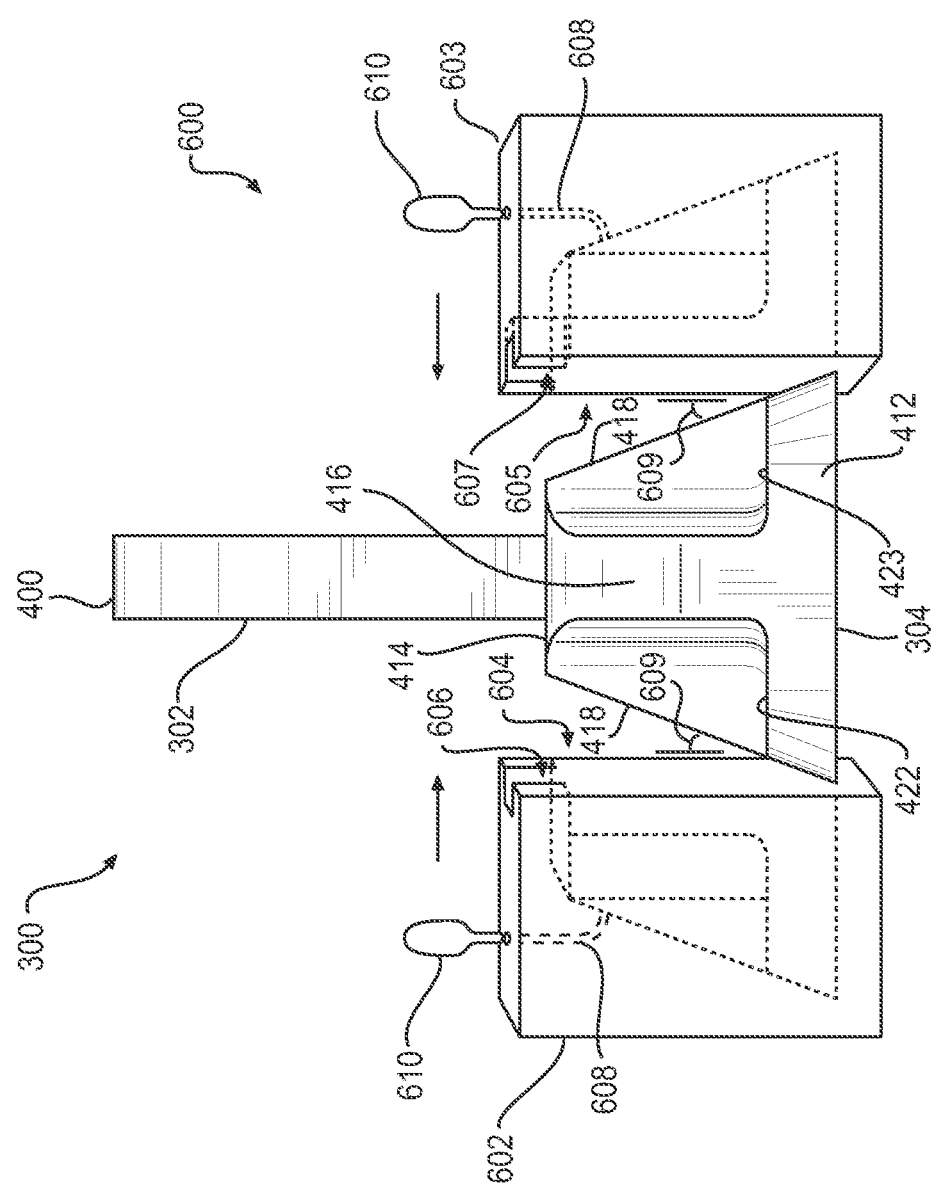
FIG. 6 is an end view of the blade cleat assembly of FIG. 4, and a schematic view of an embodiment of a molding system for molding the blade cleat assembly of FIG. 4.
Figure 7:
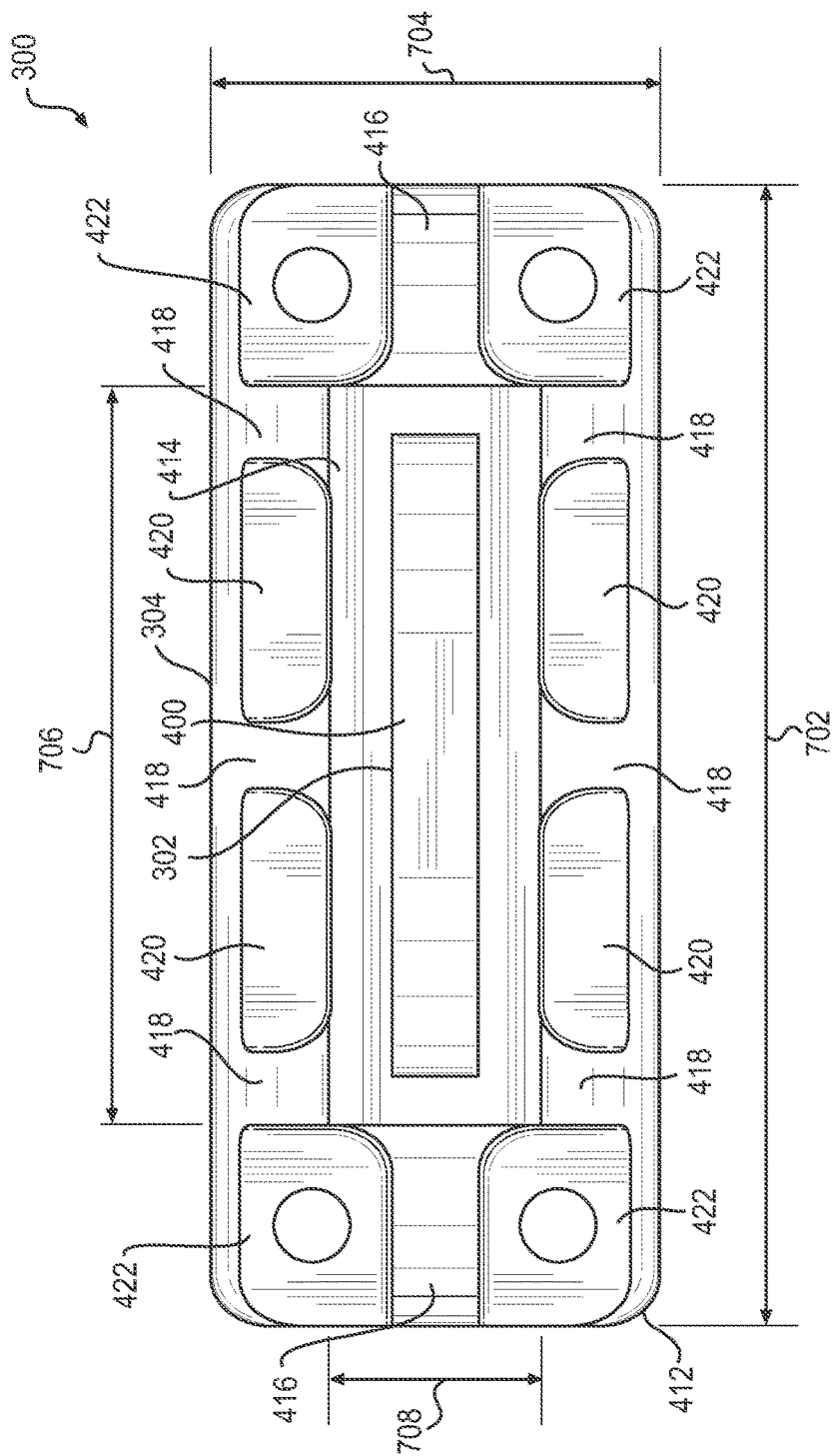
FIG. 7 is a top plan view of the blade cleat assembly of FIG. 4.
Figure 18:
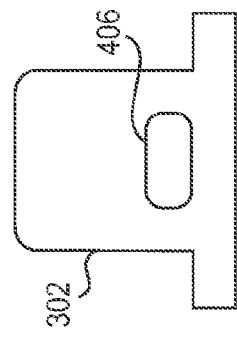
FIG. 18 is a side plan view of an embodiment of a blade member having an oval-shaped through-hole.
Figure 19:
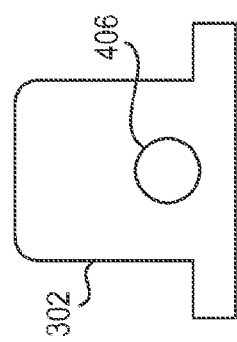
FIG. 19 is a side plan view of an embodiment of a blade member having a circular-shaped through-hole.
Figure 20:
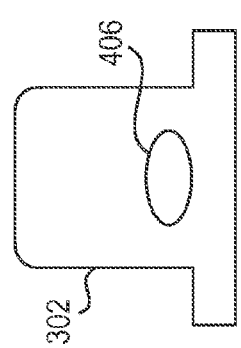
FIG. 20 is a side plan view of an embodiment of a blade member having a generally rectangular-shaped through-hole.
Figure 21:
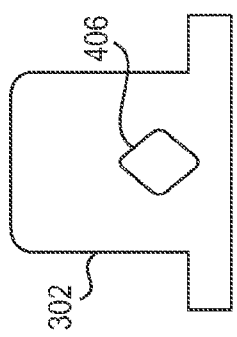
FIG. 21 is a side plan view of an embodiment of a blade member having a generally triangular-shaped through-hole.
Figure 22:
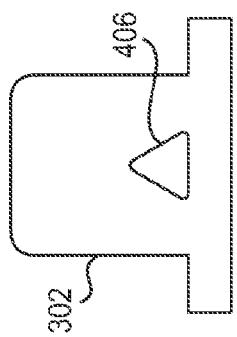
FIG. 22 is a side plan view of an embodiment of a blade member having a diamond-shaped through-hole.

A configuration, including at least size and shape, of blade cleat assembly 300 may vary. FIGS. 4-9 illustrate an embodiment of a blade cleat assembly 300. FIG. 4 is an isometric view of an embodiment of a blade cleat assembly 300. FIGS. 5-7 illustrate blade cleat assembly 300 in a profile side plan view, an end side plan view, and a top plan view, respectively. FIG. 8 is an exploded isometric bottom view of blade cleat assembly 300. And FIG. 9 is a bottom isometric view of blade cleat assembly 300.

As shown in FIGS. 4-9, in some embodiments blade cleat assembly 300 may include a blade member 302 associated with an anchor member 304. For purposes of illustrating various features of blade cleat assembly 300, in FIGS. 4, 8, and 9, hidden portions or features of blade member 302 may be shown in phantom within anchor member 304.

A configuration of blade member 302, including size and shape, may vary. As shown in FIGS. 4-9, blade member 302 generally includes a head portion 400 and a base portion 402 opposite head portion 400. As shown in FIGS. 4-9, in some embodiments blade member 302 may include a head portion 400, a base portion 402, a pair of opposing base flange portions, specifically a base flange portion 404 and a base flange portion 405, and a through hole or opening 406 in base portion 402. For purposes of convenience, base flange portion 404 and/or base flange portion 405 may be referred to simply as flange portion 404 and/or flange portion 405 through this detailed description.

As shown in FIGS. 4-9, blade member 302 generally has a planar configuration. As shown in FIGS. 4-9, in some embodiments, blade member 302 may have a planar body. As shown in FIGS. 4-9, in some embodiments, blade member 302 may have a planar base portion 402. Similarly, as shown in FIGS. 4-9, in some embodiments blade member 302 may have a planar head portion 400. At least a distal portion of head portion 400 may be exposed to a ground surface during use in an article of footwear. Those skilled in the art readily will appreciate alternative generally planar configurations suitable for use in a particular application in light of the present disclosure and desired performance characteristics of the article of footwear.

As shown in FIGS. 4-9, in some embodiments blade member 302 may include a pair of opposing base flange portions, which can be alternatively referred to as shoulder flange portions, shoulder flanges, shoulders, or flange portions. Flange portion 404 and flange portion 405 extend from opposing side edges of base portion 402. For purposes of simplicity of discussion, although the disclosure may refer to only one base flange portion 404, it will be understood that base flange portion 405 may be configured as a "mirror image" of flange portion 404.

Dimensions of blade member 302 may vary. As shown in FIGS. 4-9, in some embodiments base portion 402, including flange portion 404 and flange portion 405 and at least a portion of opening 406, may be embedded in an anchor member 304 of blade cleat assembly 300. In this regard, a height 802 (see specifically, FIG. 8) of blade member 302 may vary. For example, height 802 may be selected based on an intended use of the article of footwear, such as soft turf, hard dirt, or artificial turf. A height 804 of flange portion 404 or flange portion 405 also may vary, and a relative aspect ratio of height 804 to height 802 (i.e., height 804 divided by height 802) may be selected based on a number of factors including, but not limited to, a thickness 806 of blade member 302, a thickness (or depth) of plate body 202, and a desired torsional characteristic of cleated plate member 200 including blade cleat assembly 300 and blade member 302. A width 808 of the head portion 400 similarly may vary, and may be selected based on an intended use of the article of footwear. A total width 810 of the blade member 302 also may vary, and an aspect ratio of width 808 to width 810 may be selected based on a number of factors including, but not limited to, the thickness 806 of blade member 302, a stiffness of the material of plate body 202, and a desired torsional characteristic of cleated plate member 200 including blade cleat assembly 300 and blade member 302. Those skilled in the art readily will appreciate alternative configurations and dimensions suitable for use in a particular application in light of the present disclosure and desired performance characteristics of the article of footwear.

As disclosed herein with reference to exemplary embodiments, opposing flange portion 404 and flange portion 405 may be configured to provide structure and surface area suitable for engaging molding material that forms anchor member 304, to securely hold and anchor blade member 302 in blade cleat assembly 300 when blade cleat assembly 300 is associated with, e.g., embedded in, plate body 202 of cleated plate member 200. This structure may help prevent blade member 302 from being pulled out of cleated plate member 200 when the article of footwear is being used.

Similarly, as disclosed herein with reference to exemplary embodiments, opening 406 in blade member 302 may be configured to provide a channel through blade member 302 for receiving a continuous seam of molding material that forms anchor member 304 (e.g., in a first molding process). With this configuration, the continuous seam of molding material may provide structure and surface area that engages blade member 302 to securely hold and anchor blade member 302 in blade cleat assembly 300 when blade cleat assembly 300 is associated with, e.g., embedded in, plate body 202 of cleated plate member 200. This structure may help prevent blade member 302 from being pulled out of cleated plate member 200 when the article of footwear is being used.

Further, in some embodiments opening 406 in blade member 302 may be configured to provide a channel through blade member 302 for receiving a continuous seam of a second molding material that forms plate body 202 (e.g., in a second molding process). With this configuration, the continuous seam of second molding material may provide structure and surface area for engaging blade member 302 to securely hold and anchor blade member 302 in blade cleat assembly 300 when blade cleat assembly 300 is associated with, e.g., embedded in, plate body 202 of cleated plate member 200. This structure also may help prevent blade cleat assembly 300 from being pulled out of cleated plate body 202 when the article of footwear is being used.

Further, in some embodiments the first molding material may be mold compatible with the second molding material, so that the second molding material bonds with the first molding material, e.g., in a second molding process. In this manner, for example, a first molding material of anchor member 304 generally may be bonded, e.g., by co-molding or other bonding process, with a second molding material of plate body 202 of cleated plate member 200.

Further, as disclosed with reference to exemplary embodiments herein, anchor member 304 may be configured to provide structure and surface area that engages a molding material that forms plate body 202, to securely hold and anchor the anchor member 304 of blade cleat assembly 300 in plate body 202 of cleated plate member 200. This configuration and structure may help prevent blade cleat assembly 300 from being pulled out of plate body 202 of cleated plate member 200 when the article of footwear is being used.

Blade member 302 may be formed of any material suitable for use as a blade cleat. Generally, blade member 302 may be made of any material suitable for generating traction with a ground surface and/or penetrating a ground surface. In some embodiments, blade member 302 may be made of a metal or metal alloy, such as stainless steel. In other embodiments blade member 302 may be made of a hard plastic or other hard molded material. Blade member 302 may be made using any known material working process, including molding, cutting, punching, milling, or other material working processes. In some embodiments, blade member 302 may be made using a finishing process. For example, blade member 302 may be made using a finishing coating process, e.g., a metal blade may be made using a tempering process. It will be appreciated that the generally planar configuration of blade member 302 may enable efficient, low cost manufacture of blade member 302 with high dimensional fidelity. It also will be appreciated that the generally planar configuration of blade member 302 may enable or facilitate interchangeability of blade members in one or more molding systems. Those skilled in the art readily will appreciate alternative materials and processes for making blade member 302 suitable for a desired application.

FIG. 6 illustrates in schematic view an embodiment of a molding system 600 that may be used to make a blade cleat assembly 300. In some embodiments, molding system 600 may be an injection molding system. Molding system 600 may include one or more components typically associated with an injection mold, including components not described herein. In some embodiments, molding system 600 may be a static mold. Those skilled in the art readily will appreciate alternative molding systems for making a blade cleat assembly 300.

As shown in FIG. 6, in some embodiments molding system 600 may include a first mold member 602 having a first mold cavity 604 for forming a portion of an anchor member 304 on one side of a blade member 302 and a second mold member 603 having a second mold cavity 605 for forming a portion of the anchor member 304 on the opposing side of the blade member 302. As shown in FIG. 6, in some embodiments, first mold member 602 and second mold member 603 may be separate opposing mold members. In alternative embodiments, first mold cavity 604 and second mold cavity 605 may be formed in a single mold member, such as a static mold member (see, e.g., FIGS. 52 and 53 below). In some embodiments, mold cavity 604 and mold cavity 605 may be mirror image mold cavities having mirror image mold surfaces and configurations. In some embodiments, mold cavity 604 and mold cavity 605 may have different mold surface features. It will be appreciated that in some arrangements or configurations of cleated plate member 200 it may be desirable to have an anchor member 304 having a different surface configuration on one side of blade cleat assembly 300 (e.g., on an external-facing side 316) than on the other side of blade cleat assembly 300 (e.g., on an internal-facing side 318) as shown in FIG. 3. Those skilled in the art readily will appreciate that molding system 600 may be configured to make an anchor member 304 of any type, shape, or configuration suitable for a desired application.

In some embodiments, mold cavity 604 and mold cavity 605 may include one or more portions configured to correspond to an exposed portion of a cleat member or structure. In some embodiments, mold cavity 604 and mold cavity 605 may include body cavity portion 606 and body cavity portion 607 that collectively correspond to a base portion of a cleat member of a cleated plate body 202. For example, FIG. 2 illustrates cleat members in a forefoot region 204 including an exposed molded base portion 208 that stands proud of an exposed surface of plate body 202. In some embodiments, body cavity portion 606 and body cavity portion 607 collectively may present a generally rectangular shaped base portion of a blade cleat member. In other embodiments, body cavity portion 606 and body cavity portion 607 collectively may be configured to present different shapes associated with a base portion of a cleat member. Exemplary shapes of base portion 208 include, but are not limited to, rectangular, hexagonal, cylindrical, conical, circular, square, trapezoidal, diamond, ovoid, as well as other regular or irregular and geometric or non-geometric shapes.

In some embodiments, molding system 600 may include provisions to introduce material used for molding (molding material) into the mold cavity 604 and mold cavity 605. In some embodiments, molding system 600 may include one or more injection cavities 610 (FIG. 6 shows two injection cavities 610). In some embodiments injection cavities 610 may include an injection tip that protrudes from molding system 600. In some embodiments, injection cavities 610 may be in fluid communication with mold cavity 604 and mold cavity 605 via orifices 608 (FIG. 6 shows two orifices 608). With this arrangement, orifices 608 allow a liquid or viscous substance to pass through injection cavities 610 and flow into mold cavity 604 and mold cavity 605. Although two injection cavities and orifices are shown in FIG. 6, which facilitates flowing molding material into mold cavity 604 and mold cavity 605 and filling in around features and areas on both sides of blade member 302, in other embodiments molding system 600 may include one or more injection cavities with corresponding orifice(s). In this regard, it will be appreciated that opening 406 (see FIG. 4) in blade member 302 enables and facilitates flow of molding material from one side of blade member 302 to the other side of blade member 302 within mold cavity 604 and mold cavity 605. In each case, molding system 600 enables molding material to flow about features of blade member 302, including opposing flange portion 404 and flange portion 405 to surround or encapsulate at least a portion of base portion 402 of blade member 302 and embed at least that portion of base portion 402 in anchor member 304. Those skilled in the art readily will appreciate alternative molding systems suitable for making an anchor member 304 and blade cleat assembly 300 having a desired configuration.

A configuration of anchor member 304, including at least size and shape, may vary. Generally, a desired configuration of anchor member 304 may be selected based on one or more factors. Exemplary factors include a size, shape, and thickness of blade member 302, a thickness (or depth) of plate body 202, a desired securing or holding configuration of blade member 302 by anchor member 304, a desired securing or anchoring configuration and/or rigidity of anchor member 304 by plate body 202, a strength of the cured or hardened molding material(s) of these associated element(s), and an amount of molding material desired for making anchor member 304 (affecting a desired cost). Those skilled in the art readily will appreciate other factors in light of the present disclosure and a desired application and performance characteristics of the anchor member 304 and article of footwear.

A molding material for anchor member 304 may vary. In some embodiments, the molding material may be one or more of the following materials: natural or synthetic rubber, hard foam, plastics, nylon, polyurethane, thermoforming plastic polyurethane (TPU), as well as other deformable or rigid materials. One or more molding materials may be selected based on a number of factors, including but not limited to a desired rigidity of a cured or hardened molded anchor member 304. Those skilled in the art will be able to select a molding material suitable for a desired application and performance characteristics of anchor member 304 and the article of footwear.

FIGS. 4-9 illustrate embodiments of a configuration for a molded anchor member 304 of a blade cleat assembly 300. In some embodiments, anchor member 304 may form a continuous surface layer that completely covers at least base portion 402 of blade member 302. As shown in FIGS. 4-9, in some embodiments anchor member 304 may include a lower base portion 412, an upper base portion 414, and at least one tapered surface portion between lower base portion 412 and upper base portion 414. As shown in FIGS. 4-9, in some embodiments anchor member 304 may include at least one end ridge portion 416 disposed between lower base portion 412 and upper base portion 414, and/or at least one side ridge portion 418 disposed between lower base portion 412 and upper base portion 414. In some embodiments, anchor member 304 may include a plurality of end ridge portions 416. As shown in FIGS. 4-9, in some embodiments anchor member 304 may include a pair of opposing end ridge portions 416 located on opposing ends of anchor member 304. In some embodiments, anchor member 304 may include one or more side ridge portions 418 on each side of anchor member 304. In some embodiments, anchor member 304 may include a plurality of side ridge portions 418 on each side of anchor member 304. As shown in FIGS. 4-9, in some embodiments anchor member 304 may include three pairs of opposing side ridge portions 418. As shown in FIG. 4, in some embodiments, transition areas adjacent end ridge portions 416, side ridge portions 418, shelf portions 420 and/or shelf portions 422 (discussed further below) may be smoothed or rounded to reduce stress points and/or regions in the molded structure. Upper base portion 414 may form a top surface of anchor member 304. As shown in FIGS. 4-9, in some embodiments, upper base portion 414 may form a flat top surface. It will be appreciated that a flat top surface of anchor member 304 may be used to locate a depth of anchor member 304 and blade cleat assembly 300 relative to an exposed bottom surface of a plate body 202 during a second molding process to form a cleated plate member 200 (see further discussion below).

A configuration of lower base portion 412 and upper base portion 414 may vary. Lower base portion 412 and upper base portion 414 generally may have a size, shape, and configuration selected for securely holding blade member 302 and for securing or anchoring blade cleat assembly 300 to plate body 202, e.g., by embedding blade cleat assembly 300 in plate body 202. As shown in FIG. 7, in some embodiments, lower base portion 412 of anchor member 304 may have a generally rectangular shape having a length 702 and a width 704. Similarly, in some embodiments, upper base portion 414 may have a generally rectangular shape having a length 706 and a width 708. The dimensions length 702, width 704, length 706 and width 708 generally may vary, and generally may be selected based on number of factors including, but not limited to, a size, shape, and width of blade member 302 and an overall size and shape of anchor member 304 selected for securing and/or anchoring blade cleat assembly 300 to plate body 202. As shown in FIGS. 4-9, in some embodiments a length of lower base portion 412 may be greater than a length of upper base portion 414 (i.e., length 702> length 706) and a width of lower base portion 412 may be greater than a width of upper base portion 414 (i.e., width 704> width 708). With this configuration, end ridge portions 416 may be tapered (angled relative to vertical) and formed over flange portion 404 and flange portion 405 to provide a desired amount of molding material for anchor member 304 above and engaging flange portion 404 and flange portion 405. In some embodiments, end ridge portions 416 may be configured at an angle 502 relative to vertical (see FIG. 5), where angle 502 may be selected to provide a desired amount of molding material for anchor member 304 above flange portion 404 and flange portion 405. Similarly, with this configuration side ridge portions 418 may be configured at an angle 609 relative to vertical (see FIG. 6). With this configuration, side ridge portions 418 may form side shelf portions 420 at lower base portion 412 between adjacent side ridge portions 418 and further may form end shelf portions 422, e.g., located at corners of lower base portion 412 between adjacent side ridge portions 418 and end ridge portions 416. With this configuration, in some embodiments side shelf portions 420 and end shelf portions 422 of anchor member 304 collectively may provide a substantial flat horizontal surface area for engaging a molding material of plate body 202 to securely anchor the anchor member 304 to plate body 202.

Although FIGS. 4-9 illustrate two end ridge portions 416 (one on each end) and six side ridge portions 418 (three on each side), the number of end ridge portions 416 and side ridge portions 418 may be selected based on a particular desired application. In the embodiment of FIGS. 4-9, the location of a single end ridge 416 at each end of a respective shoulder flange portion (e.g., flange portion 404 and flange portion 405) may provide reinforcing support structure for the respective shoulder flange portions. In the embodiment of FIGS. 4-9, the location of three side ridge portions 418 on each side may provide opposing reinforcing support structure at both side ends of blade member 302, and may also provide a continuous central reinforcing support structure that extends through opening 406 and on opposing sides of blade member 302. This multi-ridge configuration may provide substantial reinforcing support and blade holding strength with a reduced amount of required molding material (e.g., relative to a full volume block configuration). Those skilled in the art readily will appreciate alternative ridged or ribbed configurations including fewer or additional end ridge portions, side ridge portions, and/or shelf portions to provide a desired structural support suitable for a desired application and performance characteristics of the article of footwear.

As shown in FIGS. 4 and 7-9, in some embodiments, lower base portion 402 of anchor member 304 may include one or more through holes 424. In some embodiments, through holes 434 may be formed in end shelf portions 422 of lower base portion 412. In some embodiments, through holes 444 additionally or alternatively may be provided in one or more side shelf portions 420 (shown in phantom in FIG. 4). A number and size of through holes may be selected based on a number of factors including, but not limited to, a number and size(s) of any ridge(s) or shelve(s). In some embodiments, one or more through holes 424 may be formed in a molding process of anchor member 304. In other embodiments, one or more through holes 424 may be formed by removing material of anchor member 304, such as by drilling, milling, cutting, or other material removing methods. Those skilled in the art readily will appreciate alternative methods for forming one or more through-holes 424.

Each through hole 424 generally forms a channel that enables molding material of a plate body 202 to flow through the through hole 424 during a second molding process, e.g., for embedding a blade cleat assembly 300 in plate body 202. With this configuration, a second molding process may form a continuous seam of mold material of plate body 202 through a through hole 424 of anchor member 304. It will be appreciate that this configuration and molding process may provide additional securing and/or anchoring strength and rigidity to an anchor member 304 associated with plate body 202.

A configuration of blade member 302 may vary. FIGS. 10-45 illustrate embodiments of a blade member 302. Each of these embodiments illustrates a feature having an alternative configuration that may have an advantage over one or more alternative embodiment(s)/configuration(s) in a particular application. For simplicity of illustrating certain alternative configurations, features, and characteristics, FIGS. 10-45 may illustrate or describe blade member 302 as having a generally rectangular shape. It will be appreciated, however, that blade member 302 may have another shape, such as a generally trapezoidal shape. Those skilled in the art will be able to select a general shape of blade member 302 suitable for a desired application in view of the present disclosure.

A configuration of a head portion of a blade member may vary. FIG. 10 illustrates an embodiment of a blade member 302 having a rectangular or square (right angle) blade head or blade configuration. A square blade configuration may have sharp end points that may provide a high level of traction and/or ground piercing in certain conditions, such as a hard dirt surface. A square blade configuration may enable an efficient manufacturing process, such as a metal cutting or punching process, with minimum material waste.

FIGS. 11-13 illustrate embodiments of a blade member 302 having a beveled head portion or blade configuration. FIGS. 11-13 illustrate a single bevel blade configuration, a double bevel blade configuration, and a triple bevel blade configuration, respectively. In some embodiments, additional bevels could be used. In some embodiments, a length (L) and/or an angle of each bevel may be the same. In some embodiments, a length (L) and/or an angle of each bevel may be different than a length (L) and/or an angle of each other bevel. Those skilled in the art readily will appreciate that the number, length, and/or angle of the bevel(s) may be selected to provide a desired overall shape and configuration of blade member 302. For example, a desired configuration may include a desired total length of a blade edge, and/or a desired relative length of a blade edge to a height of blade member 302. In some embodiments, a beveled blade configuration may provide a high level of traction and/or ground piercing in certain conditions, such as a hard dirt surface. In some embodiments, a beveled blade configuration may provide an improved level of safety to the user and others.

FIGS. 14-17 illustrate embodiments of a blade member 302 having a rounded head portion or blade configuration. FIGS. 14-16 illustrate rounded blade configurations having a small radius (90 degree angle), a large radius (90 degree angle), and a large radius-small angle (less than 90 degree angle), respectively. FIG. 17 illustrates an embodiment of a blade member 302 having an arch-shaped head portion or blade configuration, e.g., of radius R. In some embodiments, a size of the radius and/or a size of the angle may be selected to provide a desired overall shape and configuration of blade member 302, including a total length of the blade edge and a relative length of a blade edge to a height of blade member 302. In some embodiments, a rounded blade configuration may provide a desired level of traction with a reduced level of abrasion in certain conditions, such as a baseball cleat used both on a dirt infield and an artificial turf surface outfield. In some embodiments, a rounded blade configuration may provide an improved level of safety to the user and others.

A configuration of an opening in the blade member may vary. FIGS. 18-30 illustrate embodiments of an opening 406 of the blade member 302. Generally, a configuration of opening 406 in blade member 302 may be selected for a desired application. In some embodiments, the configuration of opening 406 may be a regular geometric shape. FIGS. 18-22 illustrate embodiments of alternative exemplary openings 406 having regular geometric shapes including an oval configuration, a circular configuration, a generally rectangular configuration, a triangular configuration, and a diamond configuration, respectively. In some embodiments, however, a configuration of opening 406 may be a non-regular geometric shape. Those skilled in the art readily will appreciate various factors considered for determining a shape of opening 406 for a particular application in view of the present disclosure.

A location of an opening in the blade member may vary. In some embodiments, a location of opening 406 in the base portion of blade member 302 may be selected relative to a height of shoulder or flange portions (e.g., flange portion 404 and flange portion 405). FIG. 23 illustrates an embodiment of a blade member 302 including an opening 406 having a horizontal axis aligned with a level of flange portions 404 and flange portion 405. FIG. 24 illustrates an embodiment of a blade member 302 including an opening 406 having a horizontal axis that is located below a level of flange portion 404 and flange portion 405. FIG. 25 illustrates an embodiment of a blade member 302 including an opening 406 having a horizontal axis that is located above a level of shoulder flange portion 404 and flange portion 405. A desired height of opening 406 may be selected based on a number of factors, including a shape of opening 406, a thickness (or depth) of plate body 202, a height and/or thickness of blade member 302, a height of flange portion 404 and/or flange portion 405, and a number, shape, and/or orientation of opening 406. A height of opening 406 also may be selected based on a strength or rigidity of the cured/hardened molding material forming anchor member 304, and/or a strength or rigidity of a cured/hardened molding material forming plate body 202. Those skilled in the art readily will appreciate factors considered for determining a height location of opening 406 for a particular application.

In each of the above embodiments, opening 406 is disposed in a central location in a lateral (width) direction of blade member 302. In some embodiments, an opening 406 may be disposed offset from a central location in the lateral direction of blade member 302.

A number and location of openings or through holes in the blade member may vary. FIGS. 26-30 illustrate embodiments of a blade member 302 having multiple openings 406 providing multiple mold material channels through blade member 302. FIG. 26 illustrates an embodiment of a blade member 302 having two generally square or rectangular openings 406 arranged in a straight line (horizontal) configuration. FIG. 27 illustrates an embodiment of a blade member 302 having three diamond-shaped openings 406 arranged in a straight line (horizontal) configuration. FIG. 28 illustrates an embodiment of a blade member having three triangular-shaped openings 406 arranged in a straight line (horizontal) alternating orientation configuration (alternating pointing up/down). FIG. 29 illustrates an embodiment of a blade member 302 having three diamond-shaped openings 406 provided in an offset configuration (offset vertically). FIG. 30 illustrates an embodiment of a blade member 302 having four triangular-shaped openings 406 arranged in a fan configuration (one corner of each triangle being adjacent to each other at a single point). Each of these configurations includes multiple openings 406 that provide multiple channels for mold material to flow from one side of blade member 302 to the other side of blade member 302 during a molding process of a blade cleat assembly 300, thereby providing multiple continuous seams of mold material of anchor member 304 extending through blade member 302. Each of these configurations also provides a blade member 302 having ribbing or webbing located between the respective openings 406. This ribbed or webbed configuration may provide a desired level of stiffness and/or torsional rigidity to blade member 302 and blade cleat assembly 300, e.g., when embedded in plate body 202.

Those skilled in the art readily will be able to select a configuration of opening(s) 406 to provide desired anchoring and structural characteristics of blade member 302, anchor member 304, and blade cleat assembly 300 in view of the present disclosure.

A neck configuration of the blade member may vary. FIGS. 31-35 illustrate embodiments of a blade member 302 having alternative neck configurations. FIG. 31 illustrates an embodiment of a blade member 302 having a square neck configuration at flange portion 404 and flange portion 405. FIG. 32 illustrates an embodiment of a blade member 302 having a single bevel neck configuration at flange portion 404 and flange portion 405. FIG. 33 illustrates an embodiment of a blade member 302 having a double bevel neck configuration at flange portion 404 and flange portion 405. FIG. 34 illustrates an embodiment of a blade member 302 having a small radius rounded neck configuration at flange portion 404 and flange portion 405. FIG. 35 illustrates an embodiment of a blade member 302 having a large radius rounded neck configuration at flange portion 404 and flange portion 405. It will be appreciated that a square neck configuration may be advantageous in cost and efficiency of manufacturing. It will be appreciated that a beveled or rounded neck configuration may be advantageous in reducing stress points between blade member 302 and anchor member 304. Those skilled in the art readily will appreciate additional advantages and/or disadvantages of these and other neck configurations in different applications, and will be able to select a neck configuration suitable for a desired application.

A shoulder configuration of the blade member may vary. FIGS. 36-42 illustrate embodiments of a blade member 302 having alternative exemplary shoulder configurations. FIG. 36 illustrates an embodiment of a blade member 302 having a square shoulder configuration at flange portion 404 and flange portion 405. FIG. 37 illustrates an embodiment of a blade member 302 having a small radius rounded shoulder configuration at flange portion 404 and flange portion 405. FIG. 38 illustrates an embodiment of a blade member 302 having a large radius rounded shoulder configuration at flange portion 404 and 405. FIG. 39 illustrates an embodiment of a blade member 302 having an arched shoulder configuration at flange portion 404 and flange portion 405. FIG. 40 illustrates an embodiment of a blade member 302 having a single bevel shoulder configuration at flange portion 404 and flange portion 405. FIG. 41 illustrates an embodiment of a blade member 302 having a double bevel shoulder configuration at flange portion 404 and flange portion 405. FIG. 42 illustrates an embodiment of a blade member 302 having an angled or truncated shoulder configuration, e.g., forming an angle $\varphi$ at an upper portion of shoulder flange portion 404 and flange portion 405. It will be appreciated that a square neck configuration may be advantageous in cost and efficiency of manufacturing. It will be appreciated that a beveled or rounded neck configuration may be advantageous in reducing stress points between blade member 302 and anchor member 304. Similarly, it will be appreciated that a square shoulder configuration may be advantageous in cost and efficiency of manufacturing. And it will be appreciated that a beveled or rounded shoulder configuration may be advantageous in reducing stress points between blade member 302 and anchor member 304. Those skilled in the art readily will appreciate additional or alternative neck and/or shoulder configurations, including additional advantages and/or disadvantages of these and other shoulder and/or neck configurations in different applications, and will be able to select a shoulder and/or neck configuration suitable for a desired application.

Figure 45:
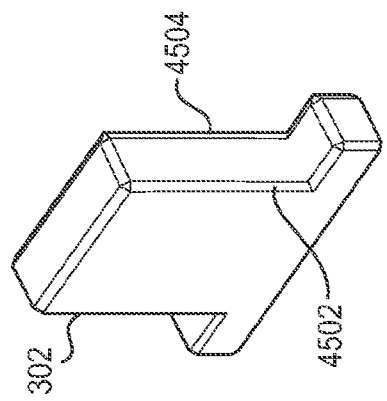
FIG. 45 is an isometric side view of an embodiment of a blade member having a beveled edge configuration.
Figure 44:
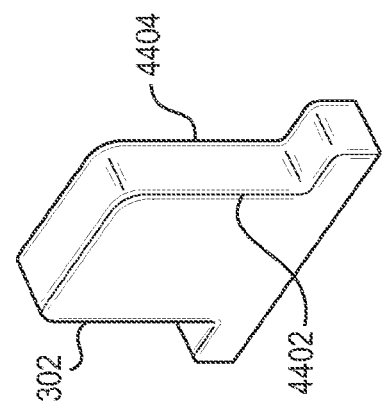
FIG. 44 is an isometric side view of an embodiment of a blade member having a rounded edge configuration.
Figure 43:
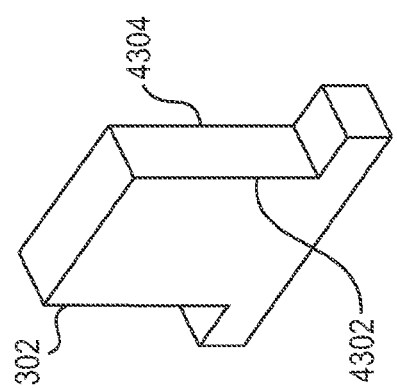
FIG. 43 is an isometric side view of an embodiment of a blade member having a square (right angle) edge configuration.

An edge configuration of the blade member may vary. FIGS. 43-45 illustrate embodiments of a blade member 302 having alternative edge configurations. FIG. 43 is an isometric side view of an embodiment of a blade member having a square (right angle) edge configuration. As shown in FIG. 43, in some embodiments both side 4302 and side 4303 of each edge of blade member 302 may have a square (right-angle) configuration. FIG. 44 is an isometric side view of an embodiment of a blade member having a rounded edge configuration. As shown in FIG. 44, in some embodiments both side 4402 and side 4404 of each edge of blade member 302 may have a rounded configuration. FIG. 45 is an isometric side view of an embodiment of a blade member having a beveled edge configuration. As shown in FIG. 45, in some embodiments both side 4502 and side 4504 of each edge of blade member 302 may have a single beveled edge configuration. It will be appreciated that other edge configurations may be used. For example, in some embodiments one edge may have a first side having one of a square, a rounded, or a beveled edge configuration, and a second side may have a different one of a square, a rounded, or a beveled edge configuration. Also, although in FIGS. 43-45 each edge of the blade member has the same edge configuration, in some embodiments one or more edges of the blade member may have a different edge configuration. It will be appreciated that a square angle edge configuration may provide an advantage in ease and efficiency of manufacture. It will be appreciated that a rounded or beveled edge configuration may provide an advantage in reducing a stress point(s) between blade member 302 and molded anchor member 304. It also will be appreciated that the edge configuration may determine a traction characteristic of blade member 302 and/or a safety characteristic of blade member 302 during use. Those skilled in the art readily will appreciate advantages and/or disadvantages of various alternative edge configurations in different applications, and will be able to select an edge configuration suitable for a desired application.

Figure 46:
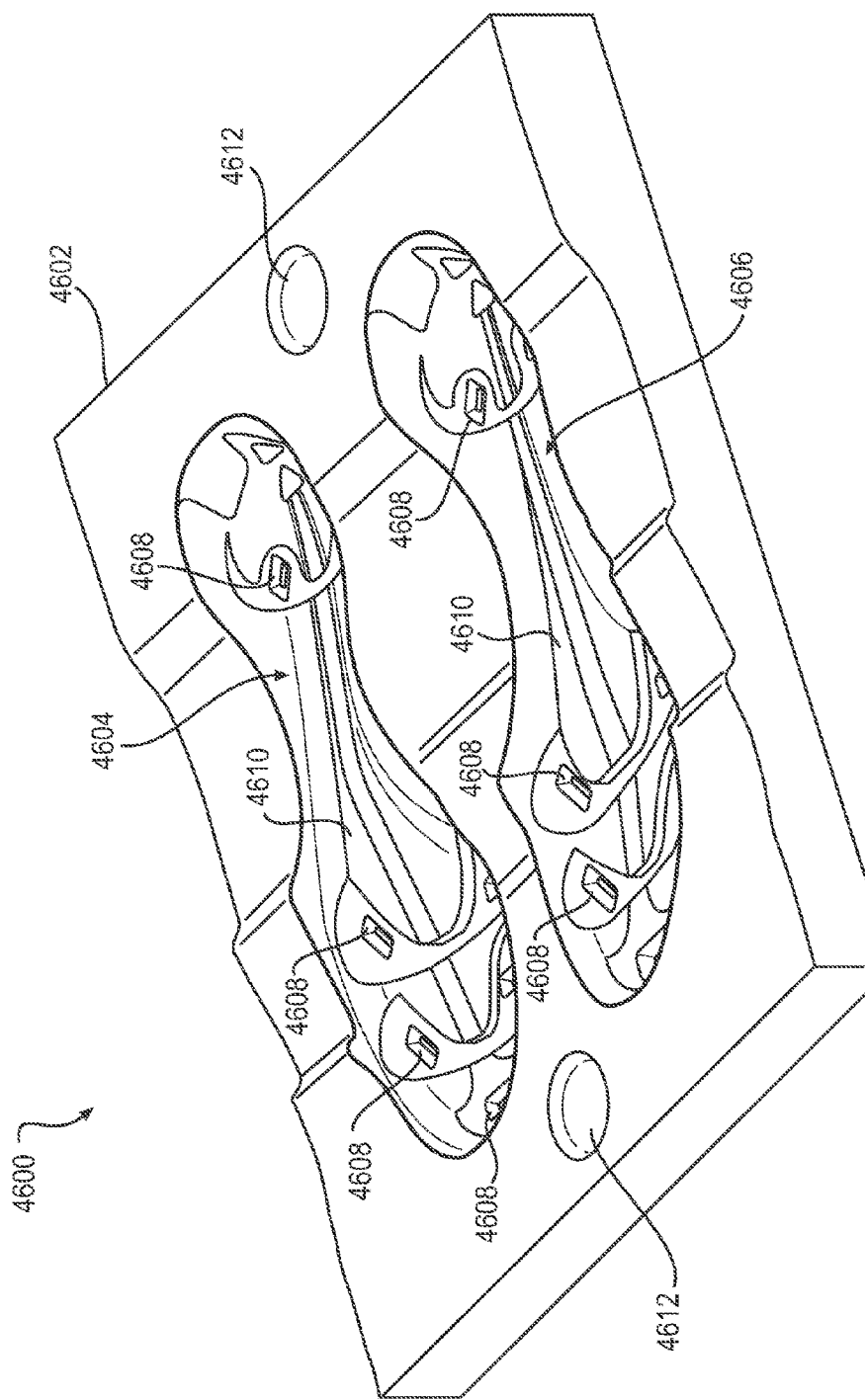
FIG. 46 is a schematic view of an embodiment of a molding system for a cleated plate member.
Figure 47:
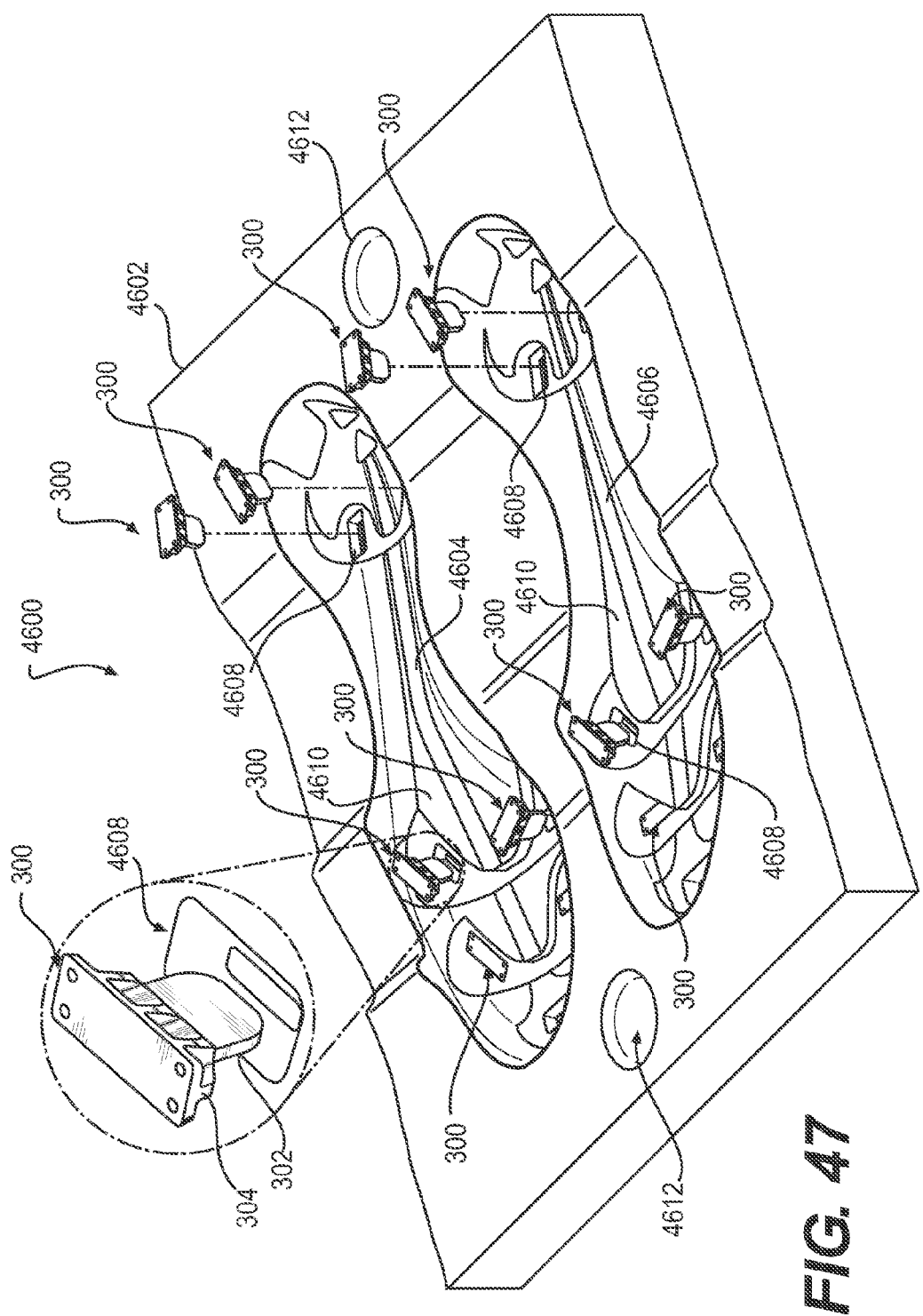
FIG. 47 is an exploded view illustrating a plurality of blade cleat assemblies being placed into a molding system for a cleated plate member, including an enlarged exploded view of a blade cleat assembly and associated cleat assembly receptacle.
Figure 48:
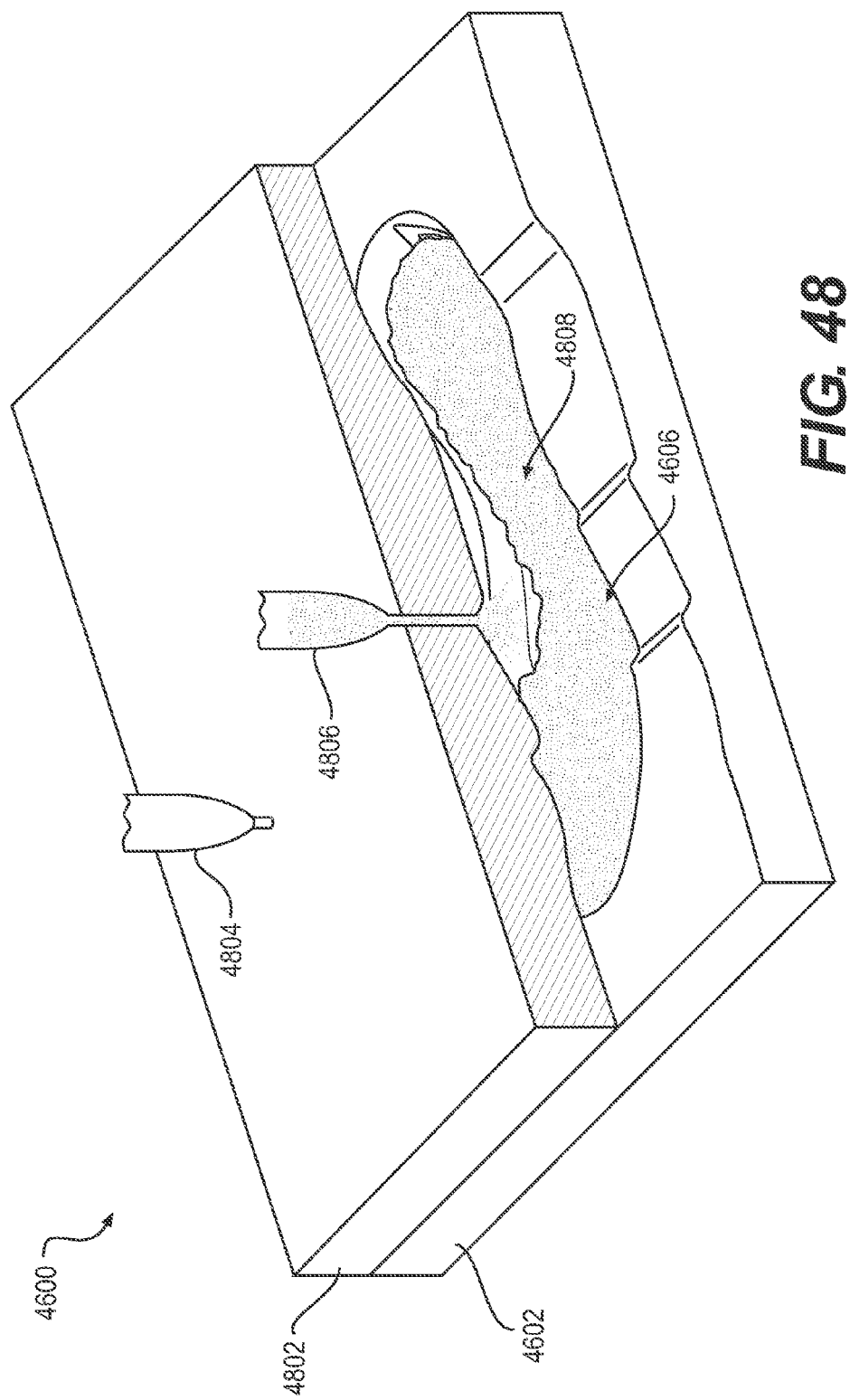
FIG. 48 is a schematic view with a partial cut away view of an embodiment of a molding system for a cleated plate member being filled with molding material.

A method for forming a cleated plate member may vary. FIGS. 46-48 illustrate embodiments of a method for forming a cleated plate member using a molding process. In some embodiments, a cleated plate member may include a plurality of blade cleat assemblies, e.g., made using a molding process as described above. FIG. 46 illustrates a schematic view of an embodiment of a molding system 4600 for forming a cleated plate member. In some embodiments, molding system 4600 may include one or more components typically associated with an injection molding system, including components not described herein.

A configuration of molding system 4600 may vary. In some embodiments, molding system 4600 may include a mold base 4602. In some embodiments, mold base 4602 may include one or more plate cavities that may be sized, configured, and dimensioned to correspond to a shape associated with a molded cleated plate member.

In some embodiments, molding system 4600 may include provisions for making a matched pair of cleated plate members. In some embodiments, mold base 4602 may include a first plate cavity 4604 and a second plate cavity 4606. In some embodiments, first plate cavity 4604 may be used to form a cleated plate member associated with a right foot and second plate cavity 4606 may be used to form a cleated plate member associated with a left foot. In some embodiments, mold base 4602 may include one or more plate cavities used to form multiple cleated plate members associated with either foot. In some embodiments, mold base 4602 may include more or fewer plate cavities used to form various cleated plate members. In some embodiments, molding system 4600 may include multiple mold bases used to form different or similar cleated plate members.

In some embodiments, each plate cavity may include one or more cleat assembly receptacles 4608. Cleat assembly receptacles 4608 each may be configured to receive a cleat assembly, such as a blade cleat assembly 300 described above. In some embodiments, cleat assembly receptacles 4608 may be sized and dimensioned so as to hold a blade cleat assembly 300 in place within a plate cavity, such as first plate cavity 4604 and/or second plate cavity 4606, so that a surface of the cleat assembly may be bonded with the molding material used to form the cleated plate member. In some embodiments, cleat assembly receptacles 4608 may be sized and dimensioned so as to hold a blade cleat assembly 300 in place within a plate cavity, such as first plate cavity 4604 and/or second plate cavity 4606, so that a portion of the cleat assembly may be recessed into or embedded within the molding material used to form the cleated plate member. In some embodiments, each of first plate cavity 4604 and second plate cavity 4606 may include a plurality of cleat assembly receptacles 4608. In some embodiments, plurality of cleat assembly receptacles 4608 may be arranged at various portions of first plate cavity 4604 and/or second plate cavity 4606 to form a cleated plate member with cleat members disposed at corresponding locations. As shown in FIG. 46, in some embodiments, first plate cavity 4604 and second plate cavity 4606 may include a plurality of cleat assembly receptacles 4608 located at portions corresponding to a forefoot region and a heel region. In some embodiments, first plate cavity 4604 and/or second plate cavity 4606 may include different numbers of cleat assembly receptacles 4608 arranged at various locations.

In some embodiments, each of first plate cavity 4604 and second plate cavity 4606 may include a plate body cavity portion 4610. In some embodiments, plate body cavity portion 4610 may be used to form a plate body of a cleated plate member that is configured to associate at least one blade cleat assembly with a plate member of the cleated plate member. In some embodiments, plate body cavity portion 4610 may be used to form a cleated plate member that may comprise essentially an entirety of an outsole of an article of footwear. In some embodiments, plate body cavity portion 4610 may be used to form a cleated plate member that may comprise only a portion of an outsole of an article of footwear, including, but not limited to, one or more of a forefoot region, a midfoot region, and/or a heel region. Additionally, in some embodiments plate body cavity portion 4610 may include additional elements used to form structural and/or aesthetic components of a cleated plate member. In some embodiments, plate body cavity portion 4610 may include one or more grooves that may be used to form transverse and/or longitudinal ribs along a cleated plate member, e.g., to provide torsional control characteristics.

In some embodiments, molding system 4600 may include provisions for aligning a mold top over mold base 4602. In some embodiments, mold base 4602 may include one or more guiding holes 4612 for aligning placement of a mold top. In such embodiments, guiding holes 4612 may be disposed on opposing sides of mold base 4602 between first plate cavity 4604 and second plate cavity 4606. In some embodiments, guiding holes 4612 may be recessed into mold base 4602 to allow for a tight fit with a mold top to prevent any molding material from spreading between first plate cavity 4604 and second plate cavity 4606. In some embodiments, molding system 4600 may include additional components typically associated with an injection mold, including components not described herein.

As shown in FIG. 47, in some embodiments each of first plate cavity 4604 and second plate cavity 4606 may receive one or more blade cleat assemblies 300 within respective cleat assembly receptacles 4608. As described above, in some embodiments cleat assembly receptacles 4608 may be sized, configured, and dimensioned to hold a blade cleat assembly 300 in place within a plate cavity, such as first plate cavity 4604 and second plate cavity 4606. In some embodiments, cleat assembly receptacles 4608 may be associated with a depth that corresponds to a portion of blade cleat assembly 300. In some embodiments, a size and depth of cleat assembly receptacle 4608 may substantially correspond to a size of blade member 302 of blade cleat assembly 300 alone, and anchor member 304 of blade cleat assembly 300 may thus be disposed above cleat assembly receptacle 4608. With this arrangement, anchor member 304 may be embedded within molding material used to form the cleated plate member. As shown in FIG. 46, in some embodiments each of first plate cavity 4604 and second plate cavity 4606 may include seven cleat assembly receptacles 4608 for receiving respective blade cleat assemblies 300 at locations corresponding to a heel region and a forefoot region of the cleated plate member. As described above, however, in some embodiments first plate cavity 4604 and/or second plate cavity 4606 may include a different number of cleat assembly receptacles 4608 arranged at different locations.

In some embodiments, molding system 4600 may be configured with cleat assembly receptacles 4608 within plate cavities that correspond to and receive a blade cleat assembly 300 that is a completed product of a prior molding system, as described above. With this arrangement, molding system 4600 may incorporate pre-manufactured blade cleat assemblies 300 into a cleated plate member. In some embodiments, a cleat assembly receptacle 4608 may form a first molding system for forming a blade cleat assembly.

Referring now to FIG. 48, a schematic view with a partial cut-away view of an embodiment of molding system 4600 for a cleated plate member is illustrated being filled with molding material. In some embodiments, molding system 4600 may include components configured to introduce molding material 4808 into first plate cavity 4604 and second plate cavity 4606. In some embodiments, molding system 4600 may include a mold top 4802. Mold top 4802 may be configured to align over mold base 4602. In some embodiments, mold top 4802 may be aligned over mold base 4602 using projections configured to correspond with guiding holes 4612 in mold base 4602, as described above.

In some embodiments, mold top 4802 may include one or more injection cavities configured to introduce molding material into plate cavities, such as first plate cavity 4604 and/or second plate cavity 4606. In some embodiments, mold top 4802 may include a first injection cavity 4804 and a second injection cavity 4806. In some embodiments, first injection cavity 4804 and second injection cavity 4806 each may include an injection tip that protrudes from mold top 4802. In some embodiments, first injection cavity 4604 and second injection cavity 4806 may be in fluid communication with first plate cavity 4604 and second plate cavity 4606 in mold base 4602. In some embodiments, first injection cavity 4804 may be in fluid communication with first plate cavity 4604 via a first orifice and second injection cavity 4806 may be in fluid communication with second plate cavity 4606 via a second orifice. With this arrangement, each orifice may allow a liquid or viscous substance to pass through first injection cavity 4804 and/or second injection cavity 4806 into first plate cavity 4604 and/or second plate cavity 4606.

In the embodiment illustrated in FIG. 48, two injection cavities with corresponding orifices are shown, one corresponding to each of first plate cavity 4604 and second plate cavity 4606. With this arrangement, molding material may be provided into first plate cavity 4604 and second plate cavity 4606. In some embodiments, however, molding system 4600 may include more or fewer injection cavities with corresponding orifices. Additionally, in some embodiments, a location and arrangement of injection cavities and corresponding orifices may vary from the configuration illustrated in FIG. 48.

As shown in FIG. 48, in some embodiments a molding material 4808 may be introduced into molding system 4600 through first injection cavity 4804 and/or second injection cavity 4806. As shown in the cut-away view of FIG. 48, molding material 4808 may flow from second injection cavity 4806 through the second orifice and begin to flow and fill in second plate cavity 4606. In some embodiments, molding material 4808 may flow and fill in over a plurality of blade cleat assemblies 300 disposed within cleat assembly receptacles 4608 in second plate cavity 4606. As described above, in some embodiments molding material 4808 may flow and fill in around each anchor member 304 of a plurality of blade cleat assemblies 300. With this arrangement, molding material 4808 may substantially fill in second plate cavity 4606 around anchor member 304, e.g., to embed anchor member 304 within a molded cleated plate member. In some embodiments, molding material 4808 also may fill in plate body cavity portion 4610 to form a molded cleated plate member. While the molding process used to form a cleated plate member has been described with reference to second plate cavity 4606, it should be understood that a substantially similar process may be used to form a cleated plate member using first plate cavity 4604.

Various types of molding material may be used to form a cleated plate member using molding system 4600. In some embodiments, molding material 4808 may be a plastic material. In some embodiments, molding material 4808 may include, but is not limited to, any one or more of the following materials: natural or synthetic rubber, hard foam, plastics, polymers, nylon, polyurethane, thermoplastic polyurethane (TPU), as well as any other deformable or rigid materials. It will be understood that other materials could be used as molding material 4808. In addition, in some embodiments a cleated plate member may be produced using more than one molding material.

Figure 49:
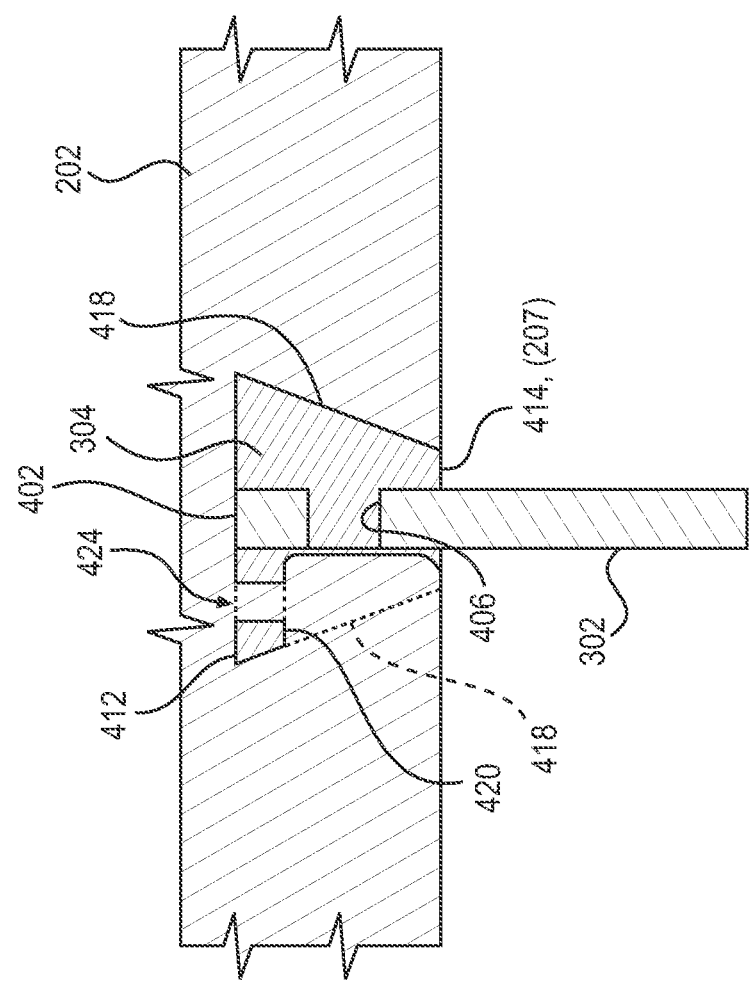
FIG. 49 is a cross-sectional view of an embodiment of a blade cleat assembly embedded in a cleated plate member taken along lines 49-49 in FIG. 3.

A manner in which a blade cleat assembly is associated with a plate member to form a cleated plate member may vary. FIG. 49 is a cross-sectional view of an exemplary embodiment of a blade cleat assembly embedded in a cleated plate member, e.g., taken along lines 49-49 in FIG. 3. As shown in FIG. 49, in some embodiments blade cleat assembly 300 may be embedded such that an upper base portion 414 of anchor member 304 may be flush with a surface of plate body 202, so that an entire exposed portion of blade member 302 of blade cleat assembly 300 may be exposed at the exposed bottom surface of plate body 202 (see also, e.g., upper surface 207 in heel region 206 of FIG. 2). As shown in FIG. 49, in some embodiments the mold material that forms anchor member 304 may encapsulate base portion 402 of blade member 302. As particularly shown in cross-section in FIG. 49, in some embodiments the molding material that forms anchor member 304 may provide a continuous seam of molding material through a mold material channel in base portion 402 of blade member 302

(e.g., opening 406 in FIG. 49). A molding configuration including one or more of these features may provide a sturdy construction that helps prevent pull-out of blade member 302 from anchor member 304 and plate body 202. Also as shown in FIG. 49, in some embodiments the molding material that forms plate body 202 may encapsulate anchor member 304 of blade cleat assembly 300. As shown in FIG. 49, in some embodiments the molding material that forms plate body 202 may capture lower base portion 402 to form an engaging surface that is substantially parallel to an exposed bottom surface of plate body 202. As shown in FIG. 49, in some embodiments the molding material may provide a continuous seam of molding material through mold material channels of anchor member 304 (e.g., through hole 424 in FIG. 49). A molding configuration including one or more of these features may provide a secure or sturdy construction that helps prevent pull-out of anchor member 304 and blade cleat assembly 300 from plate body 202.

Figure 50:
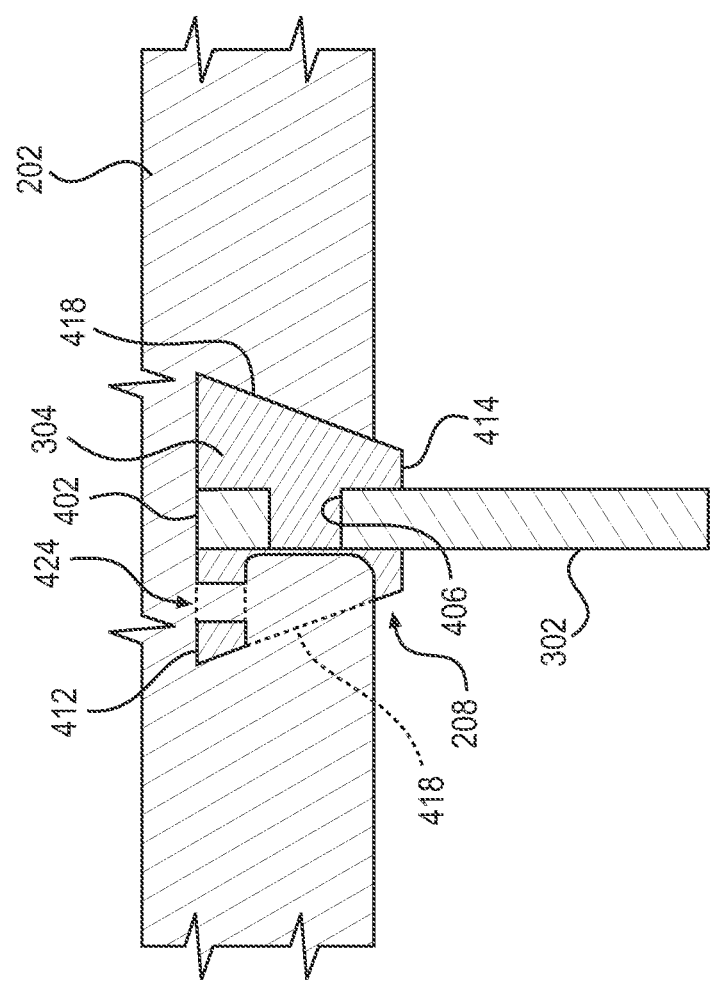
FIG. 50 is a cross-sectional view of another embodiment of a blade cleat assembly embedded in a cleated plate member.

FIG. 50 is a cross-sectional view of another exemplary embodiment of a blade cleat assembly embedded in a cleated plate member. The embodiment shown in FIG. 50 may be substantially the same as the embodiment of FIG. 49, and may provide similar features and performance characteristics. As shown in FIG. 50 however, in some embodiments anchor member 304 of blade cleat assembly 300 may be located at a height relative to an exposed bottom surface of plate body 202 such that at least a portion of anchor member 304 extends outwardly from the exposed bottom surface of plate body 202. For example, in some embodiments at least a portion of upper base portion 414 of anchor member 304 may extend out from the exposed bottom surface of plate body 202 (see also, e.g., base portion 208 of blade cleats 106 in forefoot region 204 of cleated plate member 200 in FIG. 2).

Figure 51:
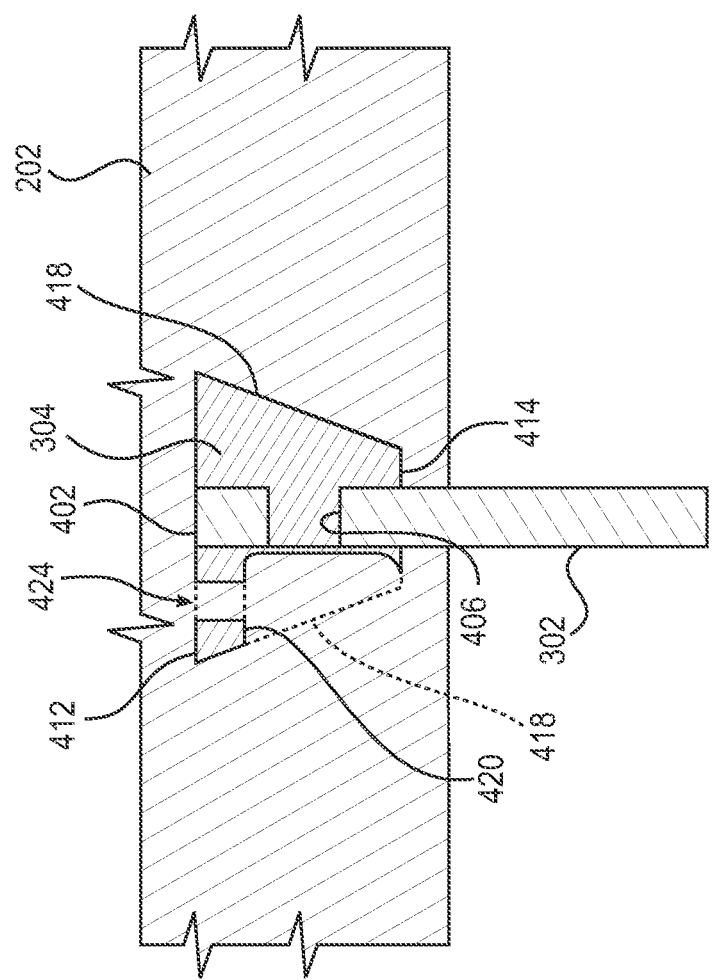
FIG. 51 is a cross-sectional view of another embodiment of a blade cleat assembly embedded in a cleated plate member.

FIG. 51 is a cross-sectional view of another exemplary embodiment of a blade cleat assembly embedded in a cleated plate member. The embodiment shown in FIG. 51 may be substantially the same as the embodiment of FIG. 49 and/or FIG. 50, and may provide similar features and performance characteristics. As shown in FIG. 51, however, in some embodiments anchor member 304 of blade cleat assembly 300 may be located at a height relative to the bottom surface of the plate body 202 such that anchor member 304 is completely encapsulated in the molding material of plate body 202, with only a portion of blade member 302 extending from the exposed bottom surface of plate body 202 (see also, e.g., blade cleats 106 in forefoot region of cleated plate member 200 in FIG. 3).

Those skilled in the art readily will appreciate that each of the embodiments shown in FIGS. 49-51 may have one or more advantage in a particular application. In some applications, one embodiment may have a more desired performance characteristic, such as a resistance to pulling out of a blade member and/or a blade cleat assembly from a plate body of a cleated plate member, providing a desired traction characteristic for a selected playing surface, or providing a desired safety characteristic. In some embodiments, one embodiment may have a more desired aesthetic characteristic than another embodiment. Those skilled in the art readily will be able to select an appropriate configuration for a desired application.

Figure 52:
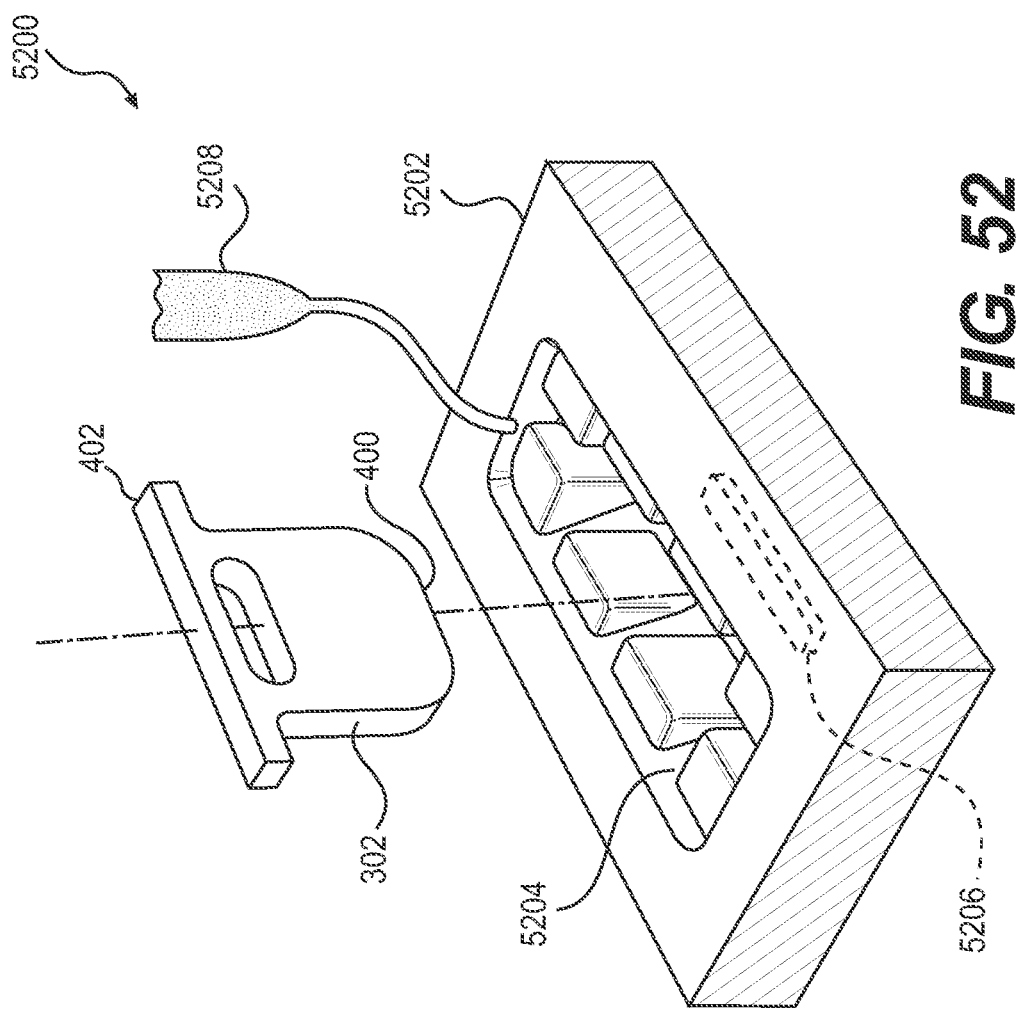
FIG. 52 is an isometric view of an embodiment of a mold plate for making a blade cleat assembly, with an embodiment of a blade member shown in exploded view.

FIG. 52 is an isometric view of another exemplary embodiment of a molding system 5200 for making a blade cleat assembly. In some embodiments, molding system 5200 may correspond to a cleat assembly receptacle 4608 of a mold base 4602 of molding system 4600 in FIG. 46. In some embodiment, molding system 5200 may be a stand-alone structure.

As shown FIG. 52, in some embodiments molding system 5200 may include a static mold plate 5202 having a mold cavity 5204 formed in a top surface of mold plate 5202. In some embodiments, mold cavity 5204 may have a mold surface that corresponds to desired surface features of an anchor member of a blade cleat assembly. In some embodiments, mold cavity 5204 may have a through hole or slot 5206 formed in a base of mold cavity 5204. In some embodiments, slot 5206 may be sized and configured to receive a head portion 400 of a blade member 302, so that head portion 400 is not encapsulated by molding material in molding system 5200. In some embodiments, slot 5206 may extend completely through the bottom of mold plate 5202, and be sized and configured to form a sealing surface with blade member 302. In some embodiments, a blade member 302 may be inserted into slot 5206 and located at a desired height in mold cavity 5204. The desired height may be determined based on a number of factors, including but not limited to a size and configuration of blade member 302, a size and configuration of molded anchor member 304, or a size and configuration of a plate body 202 into which the molded blade cleat assembly 300 may be embedded. In some embodiments, blade member 302 may be located in mold cavity 5204 so that base portion 402 may be generally flush with a lower base portion 412 of the molded anchor member 304 (see FIG. 53). In some embodiments, blade member 302 may be located so that base portion 402 is completely coated and/or encapsulated by the molding material that forms molded anchor member 304 (see FIG. 53). After blade member 302 is located in mold cavity 5204, molding material may be inserted into the mold cavity 5204 to encapsulate blade member 302 and form a blade cleat assembly 300. As shown in FIG. 52, in some embodiments a single source of molding material 5208 may be used. In some embodiments, however, two or more sources of molding material 5208 may be provided, e.g., on opposing sides of mold cavity 5204 relative to blade member 302.

Figure 53:
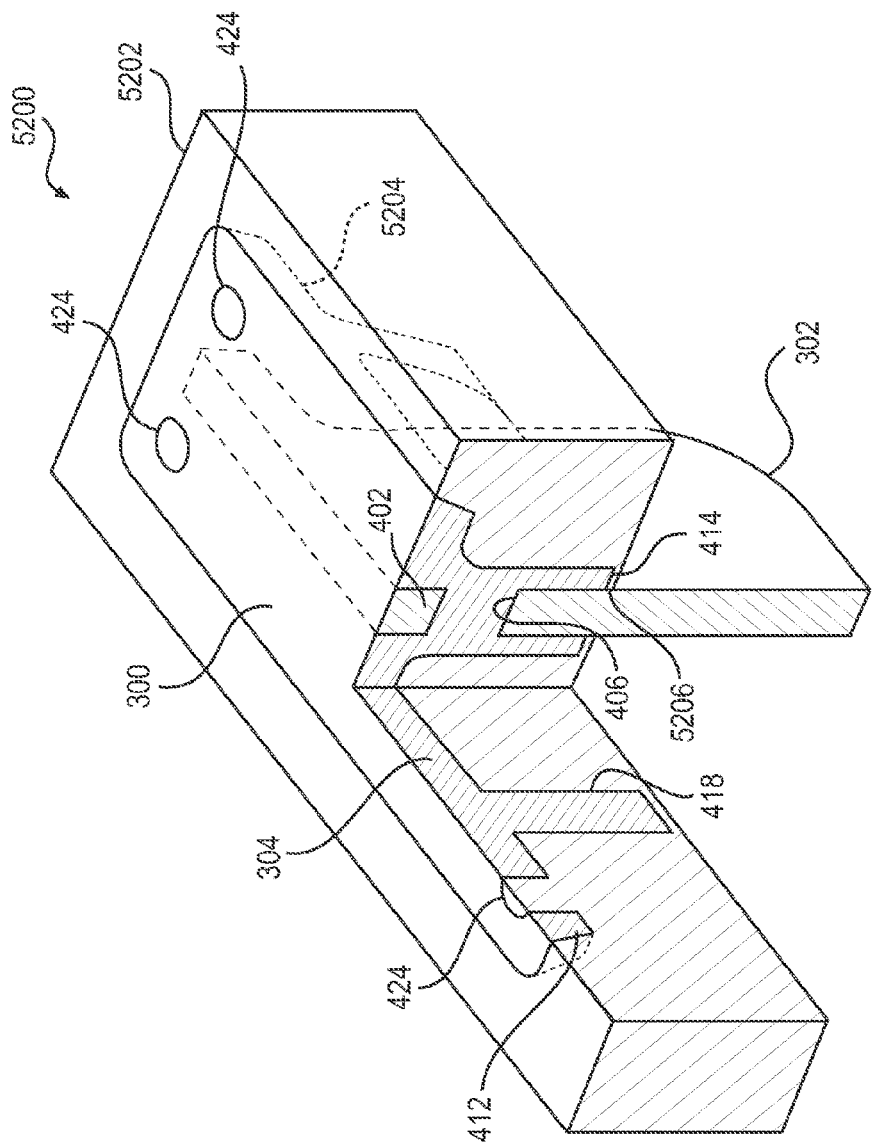
FIG. 53 is an isometric view of an embodiment of a blade cleat assembly in a mold plate of FIG. 52, including a partial sectional view of an embodiment of a molded blade cleat assembly.

FIG. 53 is an isometric view of an embodiment of a blade cleat assembly in a molding system of FIG. 52. In the embodiment of FIG. 53, mold plate 5202 has a mold cavity 5204 including a slot 5206 that extends through a bottom surface of mold plate 5202, where slot 5206 and blade member 302 form mold surfaces for a molded anchor member 304. FIG. 53 shows a partial sectional view of an embodiment of a molded blade cleat assembly 300. As shown in FIG. 53, in some embodiments molding material injected into mold cavity 5204 of mold plate 5202 may flow through mold a material channel(s) in blade member 302 (e.g., opening 406) to form a continuous seam of molding material of molded anchor member 304. As shown in FIG. 53, in some embodiments mold plate 5202 may include mold surfaces that form a mold material channel(s) in lower base portion 412 of molded blade cleat assembly 300 (such as through holes 424), e.g., for receiving molding material of a plate member to form a continuous seam of molding material of a molded cleated plate member. Those skilled in the art readily will be able to design a mold plate 5202 including a mold cavity 5204 having mold surfaces for providing a blade cleat assembly 300 having desired features and performance characteristics.

While various embodiments have been described, the description is intended to be exemplary, rather than limiting and it will be apparent to those of ordinary skill in the art that many more embodiments and implementations are possible.

Accordingly, the embodiments not to be restricted except in light of the attached claims and their equivalents. Also, various modifications and changes may be made within the scope of the attached claims.

The invention claimed is:

1. A method of making a cleated plate member for an article of footwear comprising:
   forming a blade cleat assembly having an anchor member associated with a blade member, the blade member having a planar body including: (1) two substantially parallel planar sides, (2) a base portion, (3) a head portion opposite the base portion, and (4) a through hole formed in the base portion, a first molding material of the anchor member surrounding the base portion of the blade member and extending through the through hole formed in the base portion of the blade member; and associating the blade cleat assembly with an exposed surface of a plate body to form a cleated plate member.

2. The method according to claim 1, wherein forming the blade cleat assembly includes flowing the first molding material about the base portion of the blade member to form a body of the anchor member that embeds the base portion of the blade member.

3. The method according to claim 2, wherein flowing the first molding material about the base portion of the blade member includes flowing the first molding material through the through hole in the base portion of the blade member to form a continuous seam of molding material through the through hole of the blade member.

4. The method according to claim 2, wherein forming the blade cleat assembly includes flowing the first molding material about opposing shoulder flange portions of the blade member.

5. The method according to claim 2, wherein flowing the first molding material about the base portion of the blade member includes forming a tapered surface portion of the anchor member.

6. The method according to claim 2, wherein flowing the first molding material about the base portion of the blade member includes forming a supporting ridge portion of the anchor member.

7. The method according to claim 1, wherein associating the blade cleat assembly with an exposed surface of a plate body to form a cleated plate member comprises:
   disposing the blade cleat assembly in a cleat assembly receptacle of a mold cavity of a molding system configured to mold the cleated plate member.

8. The method according to claim 7, wherein disposing the blade cleat assembly in the cleat assembly receptacle includes selectively locating the blade cleat assembly within the mold cavity so that the blade cleat assembly is at least partially recessed in the cleated plate member molded by the molding system.

9. The method according to claim 7, wherein disposing the blade cleat assembly in the cleat assembly receptacle includes selectively locating the blade cleat assembly within the mold cavity so that the blade cleat assembly is at least partially embedded in the cleated plate member molded by the molding system.

10. The method according to claim 7, wherein disposing the blade cleat assembly in the cleat assembly receptacle includes selectively locating the blade cleat assembly within the mold cavity so that the blade cleat assembly is located at a selected height relative to the exposed surface of the cleated plate member molded by the molding system.

11. The method according to claim 7, further comprising:
    disposing a plurality of blade cleat assemblies in a respective plurality of cleat assembly receptacles of the mold cavity of the molding system.

12. The method according to claim 7, wherein the cleat assembly receptacle is sized and dimensioned to correspond to the respective blade cleat assembly.

13. The method according to claim 7, wherein the cleat assembly receptacle includes a slot sized and dimensioned to receive at least a portion of the blade member of the blade cleat assembly.

14. The method according to claim 7, further comprising:
    injecting a second molding material into the mold cavity of the molding system to form the cleated plate member,
    wherein the second molding material is mold compatible with the first molding material of the anchor member of the blade cleat assembly.

15. The method according to claim 14, wherein the second molding material bonds with the first molding material of the anchor member of the blade cleat assembly.

16. The method according to claim 14, wherein at least a portion of the anchor member of the blade cleat assembly is recessed within the second molding material of the cleated plate member.

17. The method according to claim 14, wherein at least a portion of the anchor member of the blade cleat assembly is embedded within the second molding material of the cleated plate member.

18. The method according to claim 14, wherein injecting the second molding material into the mold cavity of the molding system includes flowing the second molding material through the through hole of the blade member of the cleated plate member to form a continuous seam of the second molding material through the through hole of the blade member.

19. A cleated plate member for an article of footwear, comprising:
    a plate body made of a first molding material; and
    at least one blade cleat assembly associated with an exposed surface of the plate body and including an anchor member associated with a blade member, the blade member having a planar body including two substantially parallel planar sides, the planar body having a base portion, a head portion opposite the base portion, and a through hole formed in the base portion, the head portion extending beyond the anchor member away from the plate body, a second molding material of the anchor member surrounding the base portion of the blade member and extending through the through hole formed in the base portion of the blade member.

20. The cleated plate member according to claim 19, wherein the first molding material surrounds at least a portion of the anchor member to recess at least the portion of the anchor member of the blade cleat assembly within the plate body of the cleated plate member.

21. The cleated plate member according to claim 19, wherein the first molding material surrounds at least a portion of the anchor member to embed at least the portion of the anchor member of the blade cleat assembly within the plate body of the cleated plate member.

22. The cleated plate member according to claim 19, wherein the first molding material extends through the through hole formed in the base portion of the blade member to form a continuous seam of the first molding material through the through hole of the blade member.

23. A blade cleat assembly for a molded cleated plate member of an article of footwear, the blade cleat assembly comprising:
- a blade member including a planar body having two substantially parallel planar sides, the planar body including a base portion, a head portion opposite the base portion, and a through hole formed in the base portion; and
- an anchor member made of a first molding material and operable to be attached to the molded cleated plate member, the first molding material surrounding the base portion of the blade member and extending through the through hole formed in the base portion of the blade member, the head portion extending beyond the anchor member in a direction away from the base portion.

24. The blade cleat assembly according to claim 23, wherein the base portion of the blade member includes opposing flange portions, and the first molding material forms tapered surface portions of the anchor member over the flange portions of the blade member.

25. The blade cleat assembly according to claim 23, wherein the base portion of the blade member includes opposing flange portions, and the first molding material forms opposing tapered ridge portions of the anchor member over the flange portions of the blade member.

26. The blade cleat assembly of claim 23, wherein the anchor member further includes an upper base portion, a lower base portion, and a tapered surface portion between the upper base portion and the lower base portion.

27. The blade cleat assembly of claim 23, wherein the anchor member further includes a lower base portion, an upper base portion, and a plurality of tapered ridge portions disposed on opposing sides of the anchor member between the lower base portion and the upper base portion.

28. The blade cleat assembly according to claim 27, wherein the tapered ridge portions define at least one shelf portion on the lower base portion.

29. The cleated plate member according to claim 19, wherein the through hole extends between the two substantially planar sides.

30. The blade cleat assembly according to claim 23, wherein the through hole extends between the two substantially parallel planar sides.

* * * * *